(12) United States Patent
Tran et al.

(10) Patent No.: US 9,247,480 B2
(45) Date of Patent: Jan. 26, 2016

(54) DYNAMIC THREADING GATEWAY FOR EMBEDDED HEALTH MANAGEMENT SYSTEMS

(75) Inventors: My Tran, Albuquerque, NM (US); Al Salinas, Albuquerque, NM (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 97 days.

(21) Appl. No.: 13/455,006

(22) Filed: Apr. 24, 2012

(65) Prior Publication Data

US 2013/0282921 A1 Oct. 24, 2013

(51) Int. Cl.
G06F 15/173 (2006.01)
H04W 40/24 (2009.01)
H04L 12/733 (2013.01)

(52) U.S. Cl.
CPC ........... *H04W 40/246* (2013.01); *H04L 45/122* (2013.01)

(58) Field of Classification Search
CPC ...... H04L 45/123; H04L 45/302; H04L 45/24
USPC .................. 709/241, 249; 370/328, 310, 238
See application file for complete search history.

(56) References Cited

U.S. PATENT DOCUMENTS

| | | | |
|---|---|---|---|
| 6,653,933 B2 | 11/2003 | Raschke et al. | |
| 6,771,932 B2 * | 8/2004 | Caminiti et al. | ............. 455/41.1 |
| 7,020,790 B2 | 3/2006 | Mares | |
| 7,162,653 B2 | 1/2007 | Mares et al. | |
| 7,415,548 B2 * | 8/2008 | Mahany et al. | ......... H04L 45/26 709/227 |
| 7,441,045 B2 * | 10/2008 | Skene et al. | .......... H04L 45/586 709/223 |
| 7,519,458 B2 | 4/2009 | Buckley | |
| 7,634,329 B2 | 12/2009 | Liu et al. | |
| 7,688,740 B1 * | 3/2010 | Jacobson et al. | ............... 370/238 |
| 7,869,906 B2 | 1/2011 | Louch et al. | |
| 7,983,685 B2 | 7/2011 | Silverstrim et al. | |
| 8,085,794 B1 | 12/2011 | Niver et al. | |
| 8,090,824 B2 | 1/2012 | Tran et al. | |
| 8,565,075 B2 * | 10/2013 | Russell et al. | ................. 370/228 |
| 2004/0029601 A1 * | 2/2004 | O'Neill et al. | .......... H04L 45/22 455/500 |
| 2004/0160936 A1 * | 8/2004 | Liu et al. | ........................ 370/348 |
| 2004/0205239 A1 * | 10/2004 | Doshi et al. | .................... 709/241 |

(Continued)

FOREIGN PATENT DOCUMENTS

EP 1394997 A1 3/2004

OTHER PUBLICATIONS

EP Search Report, EP 13155311.7-1862 dated Aug. 6, 2013.

(Continued)

*Primary Examiner* — Jeffrey R Swearingen
(74) *Attorney, Agent, or Firm* — Ingrassia Fisher & Lorenz, P.C.

(57) ABSTRACT

Methods and systems are provided for obtaining information via a plurality of platforms communicatively linked together via a communication network. Each of the plurality of platforms comprising a dynamically threaded gateway comprising a transceiver and a processor. The transceiver is configured to communicate with other of the plurality of platforms along a communication link. The processor is coupled to the transceiver, and is configured to identify a plurality of paths among the plurality of platforms for obtaining requested information, select a desired path of the plurality of paths based on a cost index for the plurality of paths, and obtain the information via the desired path using the transceiver.

20 Claims, 13 Drawing Sheets

(56) References Cited

U.S. PATENT DOCUMENTS

| | | |
|---|---|---|
| 2005/0251608 A1 | 11/2005 | Fehr et al. |
| 2007/0142050 A1* | 6/2007 | Handforth et al. ............ 455/436 |
| 2008/0170518 A1* | 7/2008 | Duggi et al. ................. 370/310 |
| 2010/0201516 A1 | 8/2010 | Gelvin et al. |
| 2010/0246492 A1* | 9/2010 | Scarlatti et al. ............... 370/328 |
| 2010/0254309 A1* | 10/2010 | Mankins et al. ............. 370/328 |
| 2011/0154118 A1 | 6/2011 | Tran et al. |
| 2011/0188452 A1 | 8/2011 | Borleske et al. |
| 2012/0113896 A1* | 5/2012 | Karol ........................... 370/328 |

OTHER PUBLICATIONS

EP Communication, EP 13155311.7-1862 dated Aug. 13, 2013.
Examination Report for EP 13155311.7-1862 dated Sep. 29, 2015.

* cited by examiner

DYNAMIC THREADING GATEWAY FOR EMBEDDED HEALTH MANAGEMENT SYSTEMS

STATEMENT REGARDING FEDERALLY SPONSORED RESEARCH OR DEVELOPMENT

This invention was made with Government support under Contract No. W56HZV-05-C-0724 awarded by United States Army. The Government has certain rights in this invention.

FIELD OF THE INVENTION

The present invention relates generally to health management systems, and, more particularly, to systems and methods for facilitating use of embedded health management systems of multiple platforms.

BACKGROUND OF THE INVENTION

Health management systems are utilized today on a number of platforms, such as in vehicles, airplanes, ships, and industrial controls. The health management systems typically gather data pertaining to operation of the platform in terms of sensor, equipment, sub-system, and system, and provide determinations of the current and future health of the platform based on the data. However, in some instances, current methods and systems may not always provide optimal usage of embedded health management systems of multiple platforms.

Accordingly, it is desirable to provide systems having embedded health management systems on multiple platforms with improved usage of the embedded health management systems across the platforms. It is also desirable to provide methods that provide for such with improved usage of the embedded health management systems across the platforms. Furthermore, the desirable features and characteristics of the present invention will be apparent from the subsequent detailed description and the appended claims, taken in conjunction with the accompanying drawings and the foregoing technical field and background.

BRIEF SUMMARY

In accordance with an exemplary embodiment, a method for obtaining information on a system comprising a plurality of platforms coupled via a communication link is provided. The method comprises the steps of identifying a plurality of paths among the plurality of platforms for obtaining the information, selecting a desired path of the plurality of paths based on a cost index for the plurality of paths using a processor of a dynamically threaded gateway, and obtaining the information via the desired path.

In accordance with another exemplary embodiment, a system is provided. The system comprises a dynamically threaded gateway comprising a transceiver and a processor. The transceiver resides on a host platform of a plurality of platforms. The transceiver is configured to communicate with other of the plurality of platforms along a communication link. The processor resides on the host platform. The processor is coupled to the transceiver, and is configured to identify a plurality of paths among the plurality of platforms for obtaining requested information, select a desired path of the plurality of paths based on a cost index for the plurality of paths, and obtain the information via the desired path using the transceiver.

In accordance with a further exemplary embodiment, a system is provided. The system comprises a communication network and a plurality of platforms. The plurality of platforms are coupled together via the communication network. Each of the plurality of platforms comprising a dynamically threaded gateway comprising a transceiver and a processor. The transceiver is configured to communicate with other of the plurality of platforms along a communication link. The processor is coupled to the transceiver, and is configured to identify a plurality of paths among the plurality of platforms for obtaining requested information, select a desired path of the plurality of paths based on a cost index for the plurality of paths, and obtain the information via the desired path using the transceiver.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
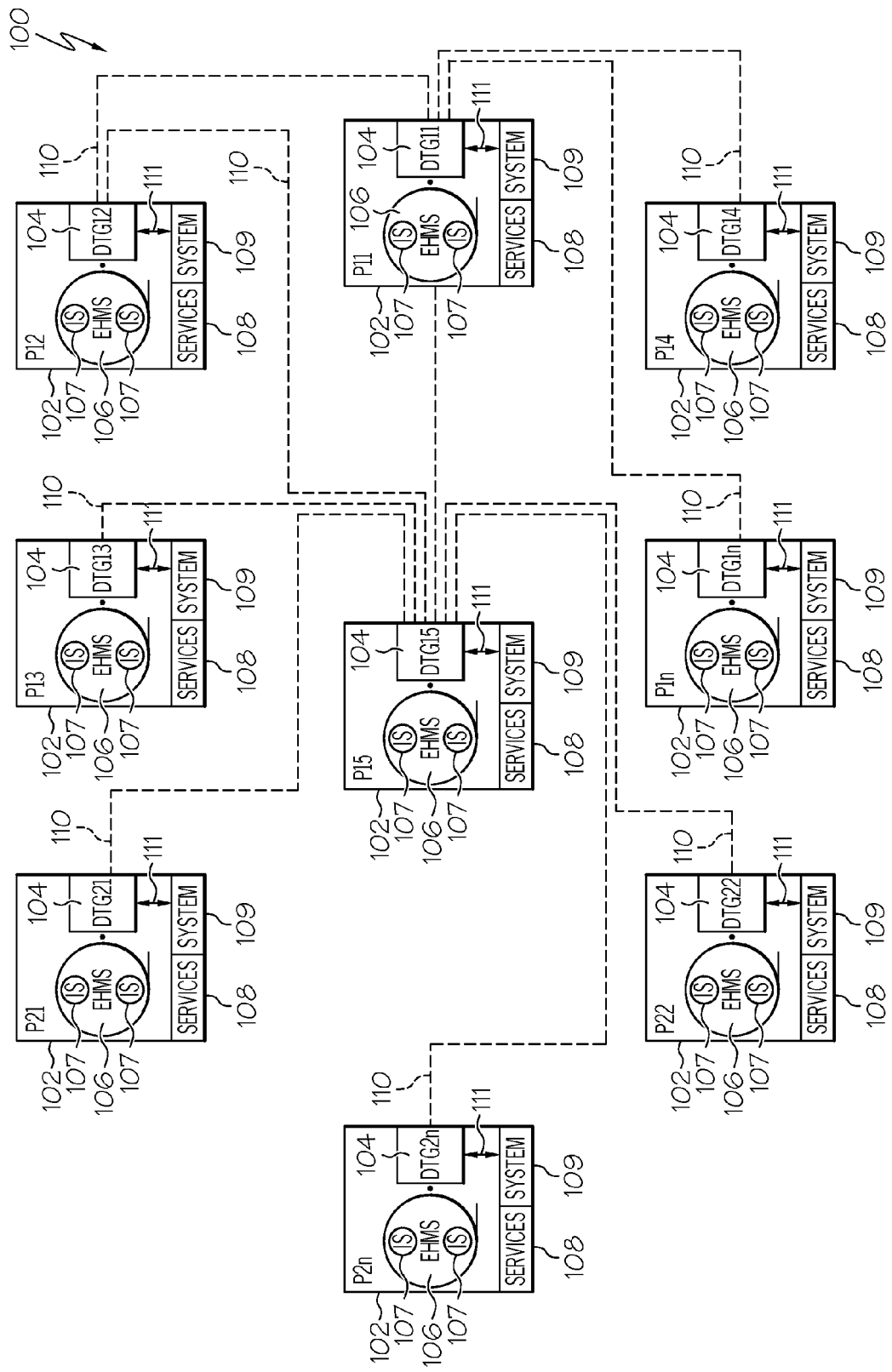
FIG. 1 is a functional block diagram of a system for monitoring health of various platforms, the system having an embedded health management system and a dynamic threading gateway for each of the platforms, in accordance with an exemplary embodiment.

FIG. 1 is a functional block diagram of a system 100 for monitoring health of various platforms 102 that are communicatively linked together via a communication data link 110, in accordance with an exemplary embodiment. The system 100 of FIG. 1, along with the other services, systems, devices, components, structures, and associated methods and steps depicted in FIGS. 1-13 and described herein, allow for improved interaction and usage of multiple platforms 102 within the system 100.

In the depicted embodiment, nine platforms 102 (or platform groups) are depicted, namely, Platform P11, Platform P12, Platform P13, Platform P14, Platform P15, Platform P21, Platform P22, Platform P1n, and Platform P2n. As depicted in FIG. 1, Platform P1n represents any number of different platforms in a first group, and Platform P2n represents any number of different platforms in a second group, for illustrative purposes. It will appreciate that the number of platforms in the system 100 may vary in different embodiments.

The types of platforms 102 may also vary in different embodiments. For example, in one exemplary embodiment, each platform 102 comprises a land vehicle. In another exemplary embodiment, each platform 102 comprises an airplane. In another exemplary embodiment, each platform 102 comprises a marine vehicle. In another exemplary embodiment, certain platforms 102 comprise one type of vehicle, while other platforms 102 comprise one or more other types of vehicles. For example, certain platforms 102 of the system 100 may comprise land vehicles, certain other platforms 102 of the system 100 may comprises aircraft, and/or certain other platforms 102 of the system 100 may comprise marine vehicles, and so on. In various embodiments, certain of the platforms 102 may comprise devices and/or systems other than vehicles, and/or that are utilized in connection with vehicles of the system 100, such as, by way of example, a command and/or observation tower, a command and control center, and/or a remote computer and/or system, for example for managing operational readiness of vehicles in a fleet, assessing military operations on a battlefield, and so on.

In the depicted embodiment, each platform 102 includes a dynamically threaded gateway (DTG) 104, an embedded health management system (EHMS) 106, various services 108 and systems 109, and one or more communication connections 111. The DTG 104 is embedded within or coupled to the embedded health management system 106 and having communication exchange with the external services 108 and systems 109. The DTG 104 facilitates the functions of the embedded health management system 106 of the platform 102 by obtaining data needed to support system operations and distributing product outputs to other DGT instances 104 and facilitates brokering information or products of interest as requested by the services 108 and systems 109. In so doing, the DTG 104 utilizes the processes, structures, and techniques described below in connection with FIGS. 2-13 in obtaining the requested information from the host platform 102 and/or from one or more other platforms 102, based on computations of an optimized cost involved in obtaining the products of interest needed (including the determination of an optimized path for obtaining requested information using a minimum number of intermediate platform nodes 104 as possible), as determined by the DTG 104 and described in greater detail further below in this Application.

The embedded health management system (EHMS) 106 provides health management, monitoring equipment health indicating data, tracking equipment and platform service history, maintenance procedure and status, tracking equipment usage and lifing, diagnostics, prognostics, and readiness assessment for the platform 102. In certain embodiments, a platform group 102 may have multiple embedded health management systems 106. In a preferred embodiment, the embedded health management system 106 comprises a computer system having a processor, a memory, and an interface. In addition, as depicted in FIG. 1, the embedded health management system 106 also preferably includes various internal services 107 (also referred to herein as sibling services to the dynamic threading gateway (DTG) 104 that are the constructed modules of the embedded health management system (EHMS) 106 of the platform 102.

The services 108 request or utilize data or information pertaining to the operation and/or health of the respective platform 102. The services 108 and the systems 109 preferably are identified as neighbor services and systems, and they are the consumer of products of interest produced by various EHMS instances 106. The internal services 107 correspond to diagnostics reasoning and maintenance reasoning and/or readiness processing of data and information pertaining to or used by the services 107 of the EHMS 106. For example, in one exemplary embodiment, services 107 of the embedded health management system 106 of the platform 102 may include some or all of the following: diagnostics reasoning and/or processing services, prognostics reasoning and/or processing services, maintenance reasoning and/or processing services, data recording and/or processing services, consumption reasoning and/or processing services, user interaction monitoring and/or processing services, health information monitoring and/or processing services, and/or any number of other different types of health management services for the platform 102. In this embodiment, the services 108 may include, by way of example only, some or all of the following: platform control services, environmental monitoring services, engine monitoring services, fuel monitoring services, situation awareness services, network management services, communications services, and/or any number of other different types of services for the respective platform 102 on which the services 108 reside (also referred to herein as the "host platform").

The systems 109 include onboard systems that utilize the functions provided by the DTG 104 to send data and request, and receive specific data generated by EHMS 106. The systems 109 may include, by way of example, one or more systems, computers, and/or devices that interact and utilize the DTG 104 to obtain the operation and/or health of the host platform 102 on which the respective system 109 resides. For example, the onboard systems 109 may include, by way of example only, some or all of the following: vehicle management system, flight control system, environmental monitoring system, engine control system, display system, data transfer system, maintenance systems, navigation system, vibration monitoring system, communications system, and/or any number of other different types of systems for the respective platforms 102.

The connection 111 link the communication between the services 108 and the onboard systems 109 with various instances of EHMS 106 through the data broker, the DTG 104, of the platform 102 of FIG. 1 to facilitate the multiple-directional data transfer. In one exemplary embodiment, the connection 111 comprises a communications bus or a network communication protocol. In another exemplary embodiment, the connection 111 comprises a wireless network. In yet other exemplary embodiments, the connection 111 may comprise any one or more of a number of different types of connections such as client and server, point to point communication, and other methods of communication.

The communication data link 110 couples the various platforms 102 together. As depicted in FIG. 1, the communication data link 110 preferably communicatively links the DTGs 104 of the various platforms 102. In a preferred embodiment, the communication data link 110 comprises one or more different types of wireless networks.

As depicted in FIG. 1, certain platforms 102 are directly linked to one another via the communication data link 110 (i.e., without requiring any intermediate links via other platforms 102). For example, (i) Platform P11 is directly linked to each of Platform P12, Platform P14, Platform P15, and Platform P1n via the communication data link 110; (ii) Platform P12 is directly linked to both Platform P11 and Platform P15 via the communication data link 110; (iii) Platform P13 is directly linked to Platform P15 via the communication data link 110; (iv) Platform P14 is directly linked to Platform P11 via the communication data link 110; (v) Platform P15 is directly linked to each of Platform P11, Platform 12, Platform P13, Platform P21, Platform 22, and Platform P2n via the communication data link 110; (vi) Platform P21 is directly linked to P15 via the communication data link 110; (vii) Platform P22 is directly linked to Platform P15 via the communication data link 110; (viii) Platform P1n is directly linked to P11 via the communication data link 110; and (ix) Platform P2n is directly linked to Platform P15 via the communication data link 110. As referenced herein, platforms 102 that are directly linked in this manner are referred to as "first level peers" of one another.

Also as depicted in FIG. 1, each platform 102 also has various "second level peers", defined as platforms 102 that are indirectly communicatively linked together via the communication data link 110 using an intermediate platform 102. Specifically, for a particular platform 102 (referred to as a host platform 102), the list of second level peers for such host platform 102 would comprise all of the platforms 102 of the system 100 that are first level peers of the first level peers of the host platform 102. For example, with respect to Platform P11, the list of second level peers would include Platforms P13, Platform P21, Platform P22, and Platform P2n, each of which are first level peers of Platform P15 (which itself is a first level peer of Platform P11), and so on.

In addition, various platforms 102 may also have various "third level peers", defined as platforms 102 that are indirectly communicatively linked together via the communication data link 110 using two intermediate platforms 102. For example, Platform P14 would be third level peers with Platform P13, Platform P21, Platform P22, and Platform P2n, as Platform P14 is indirectly communicatively linked together with each of Platform P13, Platform P21, Platform P22, and Platform P2n, as Platform P14 via the communication data link 110 using Platform P11 and P15 as two intermediate platforms 102, and so on. Various platforms 102 could also have various "higher level peers" that are similarly defined, for example as "fourth level peers", "fifth level peers", and so on.

Figure 2:
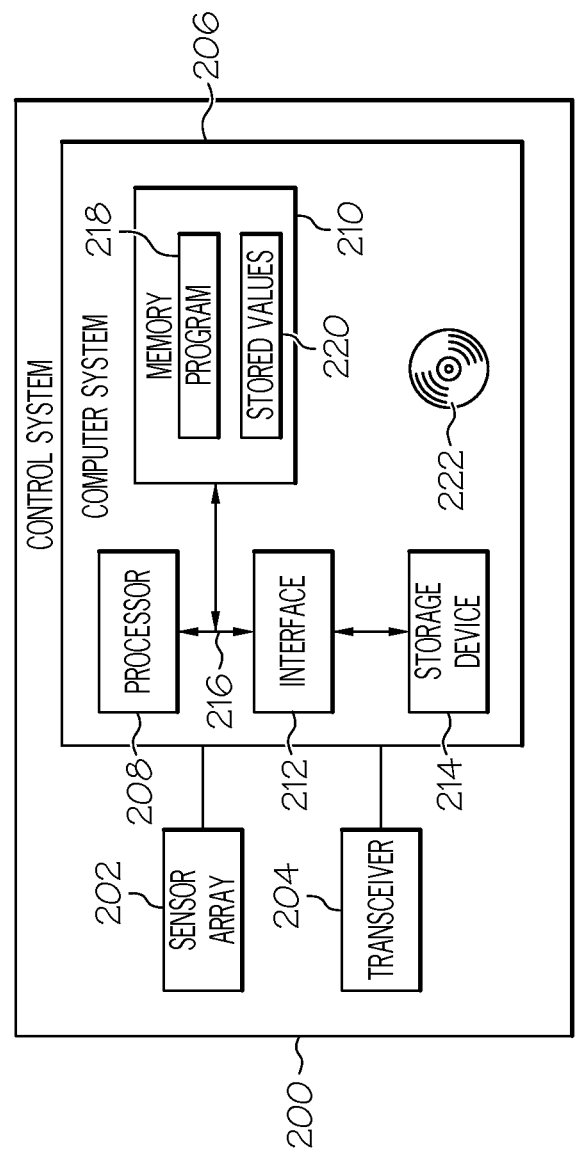
FIG. 2 is a functional block diagram of a control system, including a sensory array, a transceiver, and a computer system, that can be implemented in conjunction with the system of FIG. 1, in accordance with an exemplary embodiment.

FIG. 2 is a functional block diagram of a control system 200 that can be implemented in conjunction with the system 100 of FIG. 1, in accordance with an exemplary embodiment. Each platform 102 of FIG. 1 preferably includes such a control system 200 as depicted in FIG. 2. In one embodiment, the control system 200 is part of the DTG 104 of the respective platform 102 of FIG. 1. In certain embodiments, the control system 200, or various components thereof, may also be part of the EHMS 106, the services 108, and/or the systems 109 of the respective platform 102 of FIG. 1, and/or may be otherwise part of the respective platform 102.

As depicted in FIG. 2, the control system 200 includes a sensor array 202, a transceiver 204, and a computer system 206. The sensor array 202 includes one or more sensors for use in obtaining data for the DTG 104, the EHMS 106, the services 108, and/or the systems 109 of the respective platform 102 of FIG. 1. As such, the sensor array 202 may include any number of sensors, including various onboard sensors. Such sensors may include, by way of example, some or all of the following, among others: surface control sensor, engine temperature monitoring sensor, fuel rate monitoring sensor, chemical detection sensor, motion sensor, emission control sensor, radar detection sensors, vibration monitoring sensors, fluid level sensors, fluid pressure sensors, and/or any number of other different types of sensors for the platform 102.

The transceiver 212 of each platform 102 transmits and receives information between platforms 102 along the communication data link 110. The transceivers 212 thereby facilitate communications between the platforms 102 of FIG. 1, for example including communications pertaining to requests for information from the various services 108 and systems 109 of the various platforms 102 of FIG. 1.

The computer system 206 is coupled to the sensor array 202 and the transceiver 204, and controls the operation of the control system 200. In the depicted embodiment, the computer system 206 includes a processor 208 and a memory module 210. The processor 208 performs the computation and control functions of the control system 200, and may comprise any type of processor or multiple processors, single integrated circuits such as a microprocessor, or any suitable number of integrated circuit devices and/or circuit boards working in cooperation to accomplish the functions of a processing unit. During operation, the processor 208 executes one or more programs 218 contained within the memory 210 and, as such, controls the general operation of the control system 200 and the computer system of the control system 200, preferably in executing the steps of the processes described herein, such as the steps of the processes and implementations of FIGS. 3-13.

The memory module 210 can contain any type of suitable memory. This would include the various types of dynamic random access memory (DRAM) such as SDRAM, the various types of static RAM (SRAM), and the various types of non-volatile memory (PROM, EPROM, and flash). In certain examples, the memory 210 is located on and/or co-located on the same computer chip as the processor 208. In the depicted embodiment, the memory 210 stores the above-referenced program 218 along with one or more stored data values 220 for use in performing the steps of the various processes described throughout this application.

The bus 216 serves to transport programs, data, status and other information or signals between the various components of the computer system of the control system 200. The interface 212 allows communication to the computer system of the control system 200 with sensor array 202, transceiver 204, and system 209 and services 208 as shown in FIG. 1, for example from a system driver and/or another computer system, and can be implemented using any suitable method and apparatus. It can include one or more network interfaces to communicate with other systems or components. The interface 212 may also include one or more network interfaces to communicate with technicians, and/or one or more storage interfaces to connect to storage apparatuses, such as the storage device 214.

The storage device 214 can be any suitable type of storage apparatus, including direct access storage devices such as hard disk drives, flash systems, floppy disk drives and optical disk drives. In one exemplary embodiment, the storage device 214 comprises a program product from which memory 210 can receive a program 218 that executes one or more embodiments of one or more processes of the present disclosure, such as the steps of the processes described further below in connection with FIGS. 3-13. In another exemplary embodiment, the program product may be directly stored in and/or otherwise accessed by the memory 210 and/or a disk (e.g., disk 222), such as that referenced below.

The bus 216 can be any suitable physical or logical means of connecting computer systems and components. This includes, but is not limited to, direct hard-wired connections, fiber optics, infrared and wireless bus technologies. During operation, the program 218 is stored in the memory 210 and executed by the processor 208.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 208) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the control system 200 may also otherwise differ from the embodiment depicted in FIG. 2, for example in that the computer system of the control system 200 may be coupled to or may otherwise utilize one or more remote computer systems and/or other control systems.

Figure 3:
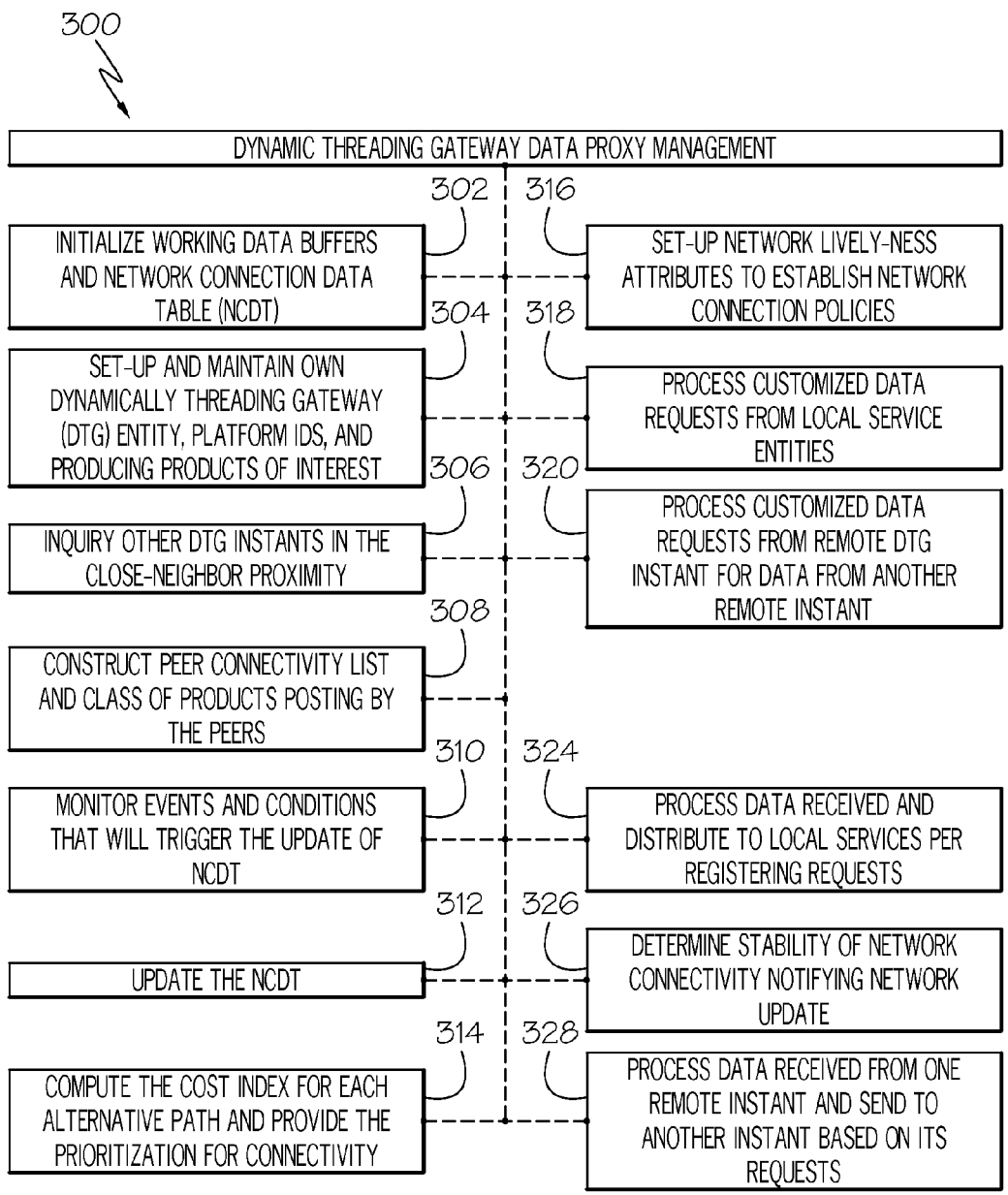
FIG. 3 is a flowchart depicting a process and composite management structure and architecture for dynamic threading gateway data proxy management and use of embedded health management systems of multiple platforms, and that can be implemented in conjunction with the system of FIG. 1 and the control system of FIG. 2, in accordance with an exemplary embodiment.

Turning now to FIG. 3, a flowchart depicting a process 300 and composite management structure and architecture is provided for dynamic threading gateway data proxy management and use of embedded health management systems of multiple platforms, in accordance with an exemplary embodiment. The process 300 of FIG. 3 can be implemented in conjunction with the system 100 of FIG. 1 the control system 200 of FIG. 2, and the various processes and implementations described throughout this application, in accordance with an exemplary embodiment. In addition, while FIG. 3 provides a broad, high-level overview of the process 300, various steps thereof are explained in greater detail in connection with FIGS. 4-13, described further below.

As depicted in FIG. 3, the process 300 includes the step of initializing working data buffers and a network connection data table (NCDT) (step 302). This step is preferably performed at the start-up, or the beginning of the process 300. This step is preferably performed by the respective dynamic threading gateways (DTGs) 104 of each of the platforms 102 of FIG. 1, preferably by a processor thereof, such as the processor 208 depicted in FIG. 2. Step 302 helps to ensure that when the information is readily available, the data state is known for each of the platforms 102 of the system 100 of FIG. 1. The results of step 302 are preferably stored in a memory, such as stored values 220 of the memory module 210 of FIG. 2.

For each platform 102, the respective DTG 104 entity, platform identifications, and products of interest are set up and maintained (step 304). The products of interest preferably refer to information and data that is sought by EHMS' services 107, one or more of the services 108 and/or systems 109 of FIG. 1. Step 304 is preferably performed by a processor of the respective platform 102 of FIG. 1, such as the processor 208 of FIG. 2. The results of step 304 are preferably stored in a memory, such as stored values 220 of the memory 210 of FIG. 2.

In addition, for each platform 102, an inquiry of products being offered is made as to other DTG 104 instants in the close-neighbor proximity to the particular platform 102 (step 306). In one embodiment, during step 306 an inquiry is made as to other DTG 104 instants that reside on platforms 102 that are first level peers (as defined above in connection with FIG. 3) of the particular platform 102 of interest. In certain embodiments, during step 306 similar inquiries are made with respect to other DTG 104 instants that reside on platforms 102 that are second level peers, third level peers, or higher level peers (as defined above in connection with FIG. 3) of the particular platform 102 of interest. The inquiries are preferably made by the DTGs 104 of each of the platforms 102 of FIG. 1, preferably using processor thereof, such as the processor 208 depicted in FIG. 2. The results of step 306 are preferably stored in a memory, such as stored values 220 of the memory module 210 of FIG. 2.

For each platform 102, a peer connectivity list is constructed, along with a listing of the class of products posting by the peer platforms 102 for that particular platform 102 and other platforms of interest (step 308). Specifically, determinations are made as to all of the products of interest offered by each of the neighboring (or peer) platforms 102 in proximity to a particular platform 102 of interest (such as first level peers, second level peers, and so on), and a configurable connectivity and product of interest relationship database is constructed for the DTG 104 of each platform 102. This step is preferably performed separately for each platform 102 by the respective DTG 104 for the particular platform 102, preferably by a processor thereof, such as the processor 208 of FIG. 2. The results of step 308 are preferably stored in a memory, such as stored values 220 of the memory module 210 of FIG. 2.

In addition, monitoring is conducted for events and conditions that would trigger an update of the NCDT (step 310). Such events may include, by way of example, an outage or error encountered with respect to a DTG 104 of a particular platform, a DTG 104 of a particular platform 102 moving in or out of range with respect to a host platform 102 of interest (for example, the respective platforms 102 moving into or out of range of transceiver, losing communication connection due to terrain masking, and the like). Such monitoring is preferably performed by each of the DTGs 104 of FIG. 1, preferably using transceiver 204, and processor 208 thereof as depicted in FIG. 2.

The NCDT is then updated after an event occurs (step 312). Preferably, the NCDT is updated by a processor of the DGT 104 (such as the processor 208 of FIG. 208) to reflect the event, and the updated NCDT is stored in memory of the DGT 104, such as the memory 210 of FIG. 2.

A cost index is calculated for each alternative path from a source platform 102 to the final destination platforms 102 in obtaining products of interest, and a prioritization list is generated to support the selection of connectivity amongst the platforms 102 (step 314). Specifically, the DTG 104 of each platform 102 conducts a separate analysis, considering the respective platform 102 to be the host platform 102, and computes a cost index for various alternate paths for obtaining information from each of the other platforms 102 for delivery to the host platform 102. The cost index preferably comprises a measure of how many intermediate platform nodes/DTGs would need to be utilized in order to obtain information from a particular platform 102 to the host platform 102. For example, the cost value of obtaining information within a particular platform 102 (i.e., from the host platform 102 itself) would have the lowest cost value (i.e., most efficient), followed by first level peer platforms 102, followed by second level peer platforms 102, followed by third level peer platforms 102, and so on. The cost index and prioritization of step 314 are preferably calculated for each platform 102 by the respective DTG 104 thereof, preferably using a processor thereof, such as the processor 208 of FIG. 2. The results of this step are preferably stored in a memory of the platform 102, such as the memory 210 depicted in FIG. 2.

In addition, network liveliness attributes (such as the stability of the connections of the various DTGs 104 with the network), and are used to establish network connection policies (step 316). These steps are preferably performed for each platform 102 by the respective DTG 104 thereof, preferably using a processor thereof, such as the processor 208 of FIG. 2. The results of this step (such as the network liveliness attributes and the network connection policies) are preferably stored in a memory of the platform 102, such as the memory 210 depicted in FIG. 2.

Customized data requests from local service entities are processed and evaluated to determine if the requests can be accommodated with products produced in the host platform or new requests for remote DTG 104 need to be generated (step 318). Specifically, in a preferred embodiment, the DTG 104 of each platform 102 receives data requests from the sibling services 107, the co-located services 108, and systems 109 of the platform 102. The DTG 104 of the host platform 102 obtains the requested data from the lowest cost platform 102 source, per the cost index and prioritization of step 314, using a processor (such as the processor 208 of FIG. 2).

In addition, customized data requests are similarly processed from remote DTG instants (step 320). Specifically, in step 320, the DTG 104 of a particular platform 102 receive data requests from DTGs 104 of neighboring platforms (such as first level peers, second level peers, third level peers, and the like) that reflect data requested from the sibling service 107, co-located services 108, and systems 109 of the neighboring platforms 102, for example for use in connection with the EHMS 106 for the neighboring platforms 102. Similar to step 318, the DTG 104 obtains the requested data from the lowest cost platform 102 source, per the cost index and prioritization of step 314, using a processor (such as the processor 208 of FIG. 2).

When the lowest cost path for obtaining data in step 318 or 320 is from a neighboring (or remote) platform 102 (i.e., a platform 102 other than the host platform 102), then specific data requests are made by the DTG 104 of the host platform 102 to the neighboring platform 102. The request is preferably transmitted by the DTG 104 using a transceiver (such as the transceiver 204 of FIG. 2) via instructions provided by a processor (such as the processor 208 of FIG. 2).

The data is then received, processed, and distributed to the local services 107 and 108, and systems 109 that requested the data (step 324). This combined step is preferably performed by the DTG 104 using a processor (such as the processor 208 of FIG. 2) and a communications link (such as the connection 111 of FIG. 1) for services 108 and systems 109 residing on the same platform 102 as the DTG 104.

In addition, a determination is made as to the stability of the network connectivity (step 326). This determination preferably includes monitoring callback of network disconnected and generating a notification to trigger a network update. This determination is preferably made by a processor of the DTG 104 of the host platform, such as the processor 208 of FIG. 2.

The data is then received, processed, and sent along with the returned command to the DTG 104 that has requested for the data (step 328). This combined step is preferably performed by the DTG 104 using a processor (such as the processor 208 of FIG. 2) and a transceiver (such as the transceiver 204 of FIG. 2) via a communications link (such as the communication data link 110 of FIG. 1) for services 107 and 108, and systems 109 residing on platforms 102 that are different from, or remote from, the host platform 102 on which the DTG 104 resides (such as, by way of example, first level peers, second level peers, third level peers, and the like).

Figure 4:
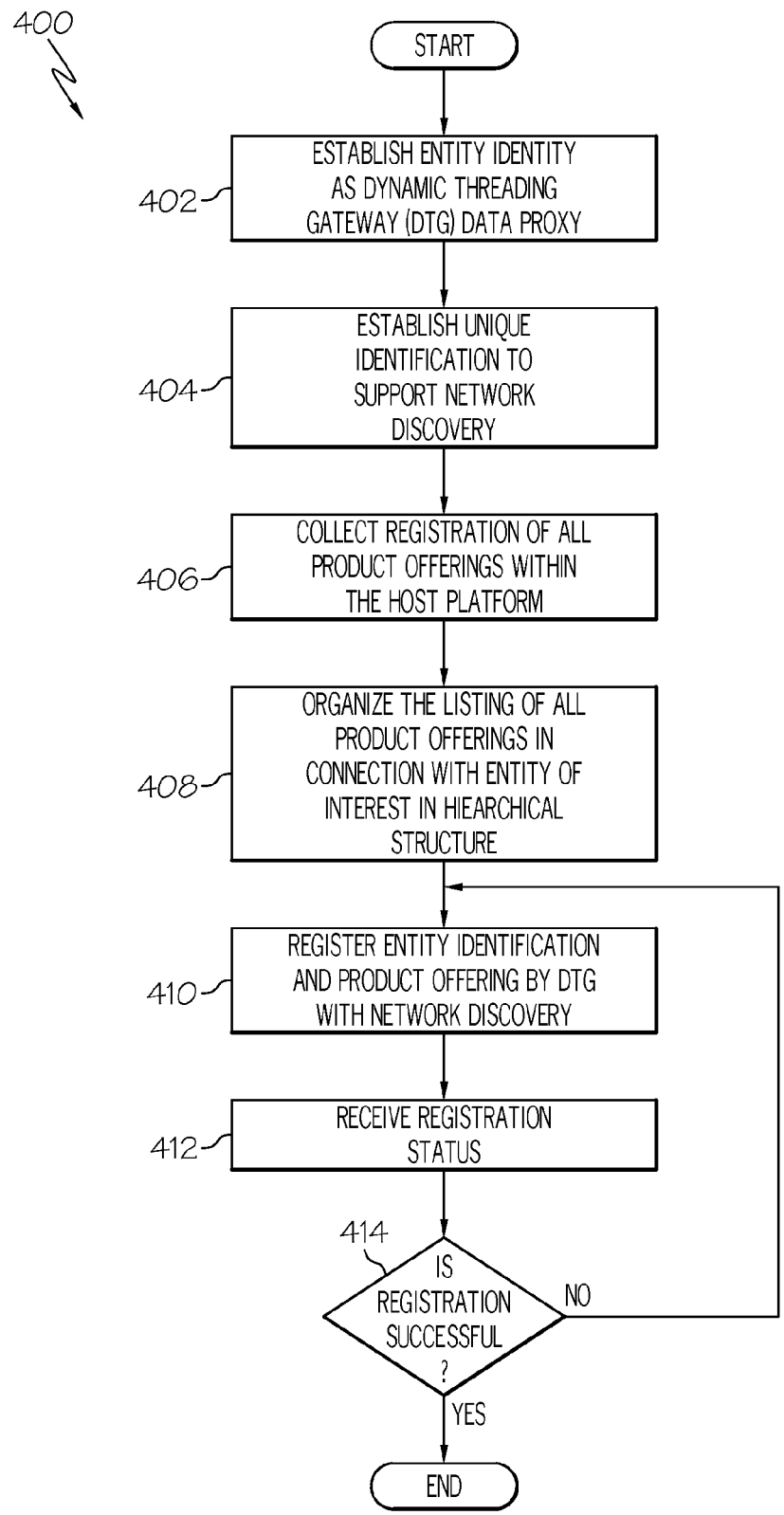
FIG. 4 is a flowchart depicting a process of establishing entity and product offerings of a dynamic threading gateway with network discovery, and that can be implemented in conjunction with the system of FIG. 1, the control system of FIG. 2, and the process of FIG. 3, in accordance with an exemplary embodiment.

Turning now to FIG. 4, a flowchart is provided for a process 400 for establishing entity and product offerings of a dynamic threading gateway with network discovery, in accordance with an exemplary embodiment. The process 400 can be implemented in conjunction with the system 100 of FIG. 1, the control system 200 of FIG. 2, the process 300 of FIG. 3, and the various other processes and implementations described throughout this application, in accordance with an exemplary embodiment. The various steps of the process 400 of FIG. 4 are preferably performed separately for each host platform 102 by the DGT 104 of the respective host platform 102 via a processor, such as the processor depicted in FIG. 2.

As depicted in FIG. 4, the process 400 includes establishing an entity identity as a dynamic threaded gateway (DTG) data proxy to support entity discovery (step 402). Specifically, the entity identity is established for each platform 102 of FIG. 1 by the DTG 104 of the respective platform 102. This is preferably performed via a processor thereof (such as the processor 208 of FIG. 2), and the resulting entity identity is preferably stored in memory thereof (such as the memory 210 of FIG. 2).

In addition, a unique identification is established for each platform 102 (step 404). The unique identification is preferably established via a processor (such as the processor 208 of FIG. 2) and stored in memory (such as the memory 210 of FIG. 2). The unique platforms identifications are used to support network discovery.

Also, for each host platform 102, a registration is collected of all products offerings within the host platform 102 (step 406). The product offerings correspond to data and information requested by the services 107 and 108, and systems 109 of FIG. 1, for example for use in connection with the EHMS 106 of FIG. 1. For example, the product offerings may include various operational data pertaining to operation of one or more vehicles and platforms of interest and that may include sensor measurement data, equipment and platform readiness, maintenance needs, maintenance and repair records for the vehicle, configuration management data, environmental conditions, and various other data and information. The registration is preferably performed by the DTG 104 via a processor, such as the processor 208 of FIG. 2.

An organization is conducted in which the product offerings of step 406 are organized in connection with an entity of interest in a hierarchical structure to support customized data requested (step 408). This allows flexibility in data inquiry, from a high level aggregation result to a contributive element or from a functional module down to system and sub-system. The organization of step 408 is preferably conducted by the DTG 104 via a processor, such as the processor 208 of FIG. 2, and the results are preferably stored in memory, such as the memory 210 of FIG. 2.

The entity identification of the host platforms 102 and the product offerings for entities of interest are registered by the respective DTG(s) 104 with network discovery (step 410). The registration record is preferably stored in a memory of the DTG 104, such as the memory 210 of FIG. 2, for subsequent use in obtaining requested data and information.

The registration status is then received by the DTG 104, preferably via a call returned from the network discovery (step 412). A determination is made as to whether the registration is successful (step 414). If it is determined in step 414 that the registration was successful, then the process 400 terminates. Conversely, if it is determined in step 414 that the registration was not successful, then the process returns to step 410, and steps 410-414 repeat until there is a determination in an iteration of step 414 that the registration is successful (at which point the process 400 terminates).

Figure 5:
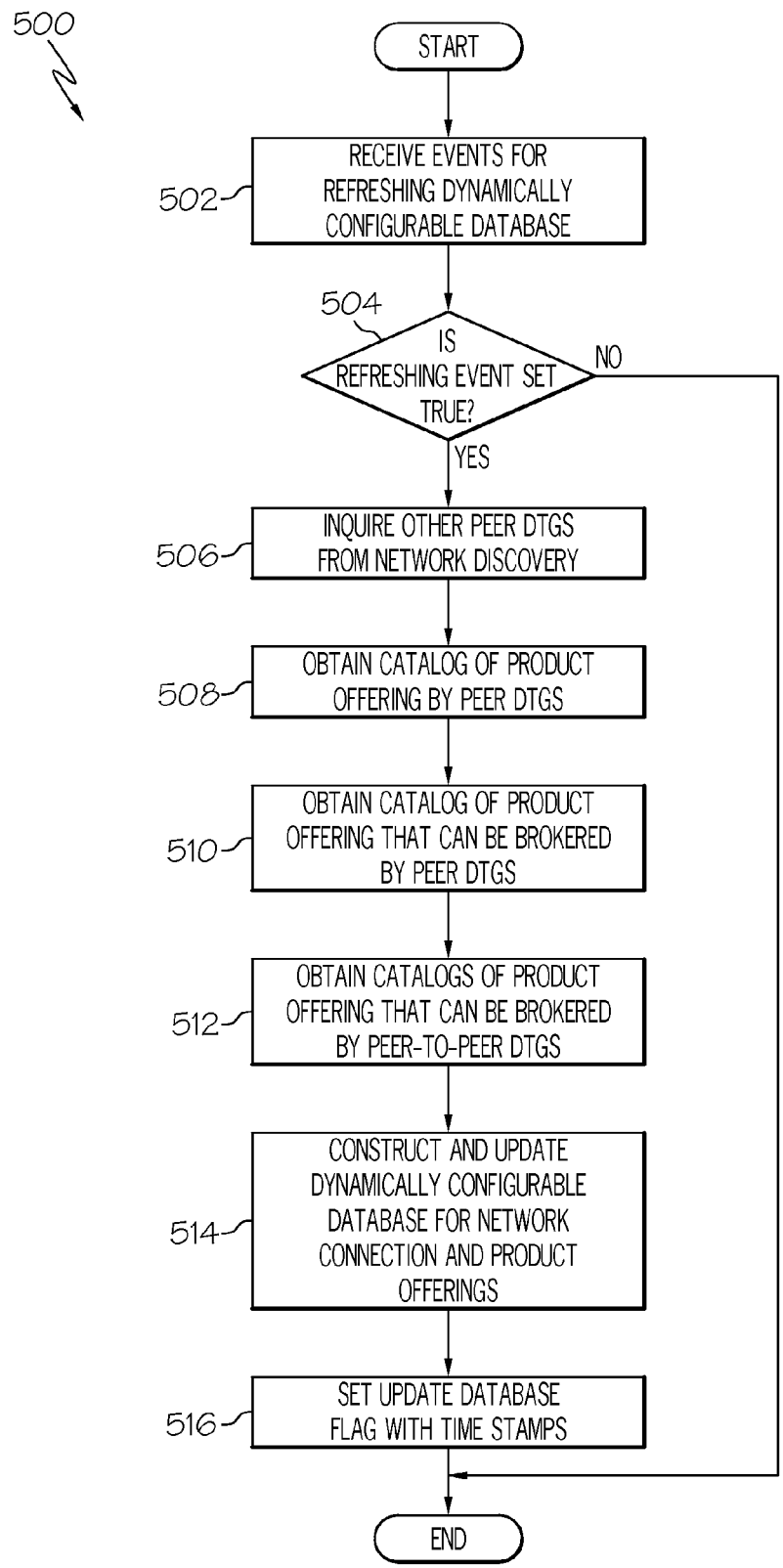
FIG. 5 is a flowchart depicting a process of establishing and updating dynamically configurable database in supporting network connection and data inquiry, and that can be implemented in conjunction with the system of FIG. 1, the control system of FIG. 2, and the processes of FIGS. 3 and 4, in accordance with an exemplary embodiment.

FIG. 5 is a flowchart depicting a process 500 of establishing and updating dynamically configurable database in supporting network connection and data inquiry, in accordance with an exemplary embodiment. The process 500 can be implemented in conjunction with the system 100 of FIG. 1, the control system 200 of FIG. 2, the processes 300, 400 of FIGS. 3 and 4, and the various other processes and implementations described throughout this application, in accordance with an exemplary embodiment. The various steps of the process 500 of FIG. 5 are preferably performed separately for each host platform 102 by the DGT 104 of the respective host platform 102 via a processor, such as the processor depicted in FIG. 2.

As depicted in FIG. 5, the process 500 includes the steps of receiving events for refreshing the dynamically configurable database (step 502). Such events may include, for example, whether there is a change in connectivity (for example, a dropout in network connection or a change in network configuration data in peer DTG 104 in FIG. 1) between the host platform 102 and a peer platform, or any number of other events that could affect network connectivity or the communications with or interaction between the various platforms 102 of the system 100 of FIG. 1. Such events are preferably detected via the network discovery. Notification of such events is preferably provided by transceivers 204 of FIG. 2, and analysis and determinations pertaining thereto are preferably made by network discovery on a processor 208 of FIG. 2.

A determination is made as to whether a refreshing event has occurred (step 504). Specifically, during step 504, a determination is made as to whether an event of step 502 has occurred that would impact the connectivity between the platforms 102 of the system 100 of FIG. 1. This determination is preferably made by a processor of the DTG 104 of the host platform 102 via a processor, such as the processor 208 of FIG. 1. If it is determined in step 504 that no such refreshing event has occurred, then the process 500 terminates.

Conversely, if it is determined in step 504 that a refreshing event has occurred, then an inquiry is made with respect to other DTGs 104 from remote discovery (step 506). Specifically, in one embodiment, inquiries are made as to which peer platforms 102 have DTGs 104 that are available for communications with the host platform 102 in light of the refreshing event. For example, if one peer platform 102 no longer has a line of sight of communication with the current host platform 102, then inquiries are made with respect to the DTGs 104 of alternate peer platforms 102 that are currently in line of sight of communication with the host platform 102 (or that are indirectly communicatively connected to the host platform 102 via one or more intermediate platforms 102). By way of further example, if a peer platform 102 has just come online and can communicate with the current host platform 102, then such peer platform 102 is part of the inquiry of step 506. Step 506 is preferably conducted via a processor and transceiver of the host DTG 104, such as by the processor 208 and the transceiver 204 of FIG. 2.

In addition, a catalog of product offerings is obtained for such peer DTGs, preferably via the transceiver of the host DTG 104 (step 508). A catalog of product offerings is also obtained that can be brokered by peer DTGs 104, (preferably also via the transceiver of the host DTG 104, as well as via the transceiver of the peer DTGs 104) (step 510). In a preferred embodiment, the catalog of product offerings of step 508 comprises product offerings of DTGs 104 of platforms 102 that are first level peers of the host platform 102, while the catalog of product offerings of step 510 comprises product offerings of DTGs 104 of platforms 102 that are second level. Step 512 is used to handle catalog of product offerings for third level and higher level peers of the host platform 102. The catalogs of steps 508, 510, and 512 are stored in memory of the DTGs 104, preferably of the host platform DTG 104, such as the memory 210 of FIG. 2.

In addition, a dynamically configurable database is constructed for the product offerings of steps 508, 510, and 512 (step 514). The dynamically configurable includes information as to the availability of the various product offerings for entities of interest from various platforms 102 connected on the network, and is used by the DTGs 104 of the various platforms 102 for obtaining data and other products of interest as requested by the various services 107 and 108, and systems 109 of the host platforms 102. The dynamically configurable database is preferably generated separately on each DTG 104 by a processor thereof (such as the processor 208 of FIG. 2) and is stored in memory of the DTG 104, such as the memory 210 of FIG. 2.

A set update database flag is then set (step 516). The set update database flag serves as an indication that the database has already been updated in response to the event, so that the database need not be updated until another refreshing event of steps 502-504 has occurred. The set update database flag is preferably set by a processor of the DTG 104 of the host platforms (such as the processor 208 of FIG. 2), and is stored in a memory of the DTG 104 (such as the memory 210 of FIG. 2).

Figure 6:
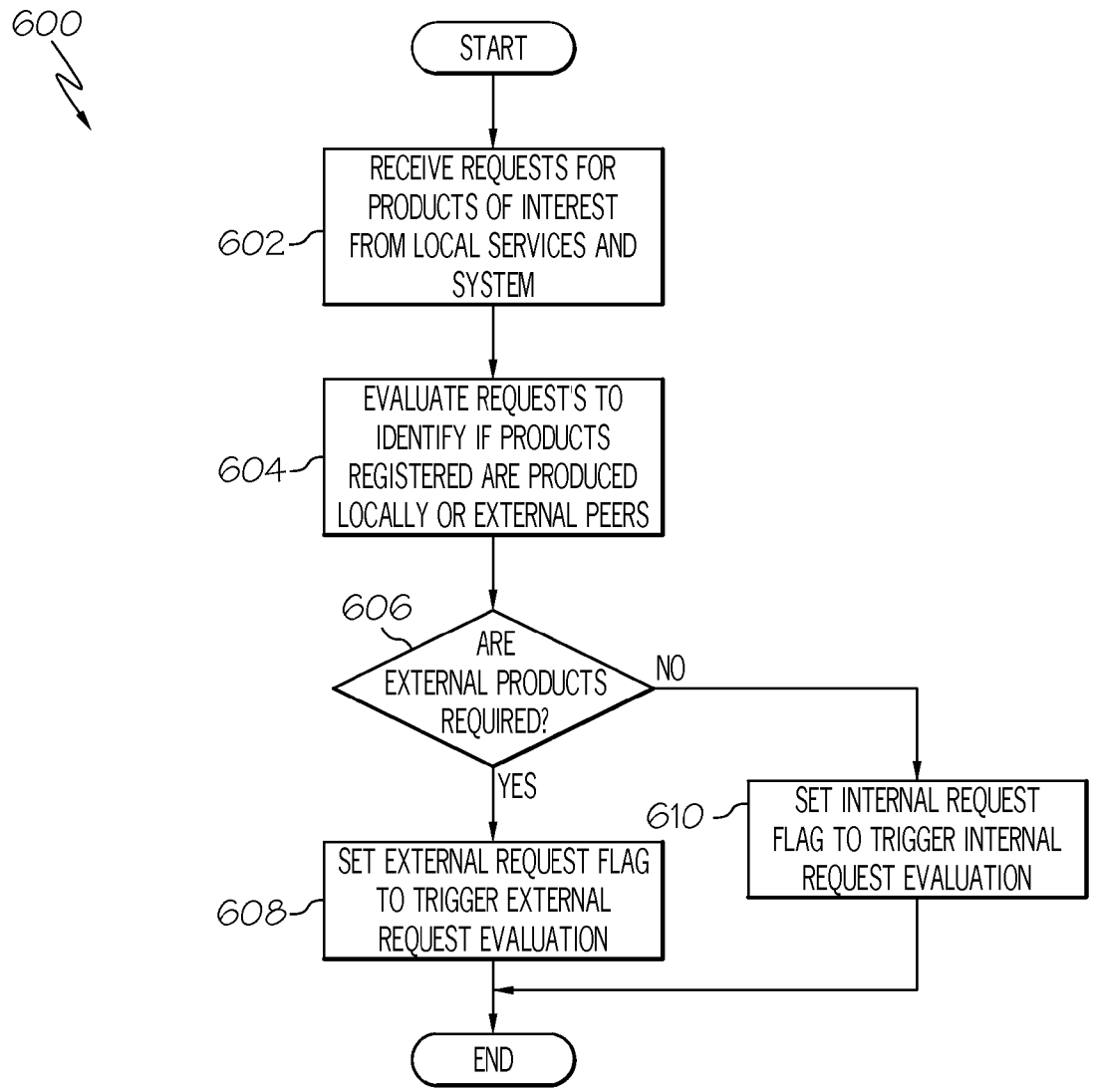
FIG. 6 is a flowchart depicting a process of establishing requests of products of interest, and that can be implemented in conjunction with the system of FIG. 1, the control system of FIG. 2, and the processes of FIGS. 3-5, in accordance with an exemplary embodiment.

FIG. 6 is a flowchart depicting a process 600 of establishing requests of products of interest, in accordance with an exemplary embodiment. The process 600 can be implemented in conjunction with the system 100 of FIG. 1, the control system 200 of FIG. 2, the processes 300, 400, 500 of FIGS. 3-5, and the various other processes and implementations described throughout this application, in accordance with an exemplary embodiment. The various steps of the process 600 of FIG. 6 are preferably performed separately for each host platform 102 by the DGT 104 of the respective host platform 102 via a processor, such as the processor depicted in FIG. 2.

During the process 600, requests for products of interest are received (step 602). Specifically, the requests for products of interest are received by the DTG 104 of each respective host platform 102 from the services and 108, and systems 109 of the host platform 102. The requests for products of interest pertain to information required by the services 107 and 108, and systems 109 to perform their functions for the platform 102, preferably in connection with the operation of the EHMS 106 of the platform 102. The requests for products of interest are preferably obtained by the DTG 104 from the services 107 and 108, and system 109 via the connection 111 of FIG. 1.

The requests of step 602 are evaluated to identify whether the products requested are produced locally on the host platform 102 (i.e., the platform on which the requests originated) or on remote, peer platforms 102 (step 604). This determination is preferably made by a processor of the DTG 104 of the host platform 102, such as the processor 208 of FIG. 2, using the catalogs and configurable databases described above in connection with the process 500 of FIG. 5.

A determination is then made as to whether external products are required (step 606). This determination preferably pertains to whether the requested products of interest are only available on remote, peer platforms 102. Specifically, if the requested products are determined to be available on the host platform 102, then external request for products is not necessary. Conversely, if the requested products are not available on the host platform, then external request for products is required, meaning that the requested products of interest must be obtained from remote, peer platforms 102. This determination is preferably made by a processor of the DTG 104 of the host platform 102, such as the processor 208 of FIG. 2.

If it is determined in step 606 that external products are required, then a set external request flag is set (step 608). The set external request flag services as a trigger to provide an external request to a remote platform 102 (i.e., a peer platform 102) to obtain the requested product of interest. This flag is preferably set by a processor of the DTG 104 of the host platform 102, such as the processor 208, and the flag is preferably stored in a memory of the DTG 104 of the host platform 102, such as the memory 210 of FIG. 2.

Conversely, if it is determined in step 606 that external products are not required, then a set internal request flag is set (step 610). The set internal request flag services as a trigger to provide an internal request within the host platform 102 to obtain the requested product of interest. This flag is preferably set by a processor of the DTG 104 of the host platform 102, such as the processor 208, and the flag is preferably stored in a memory of the DTG 104 of the host platform 102, such as the memory 210 of FIG. 2.

Figure 7:
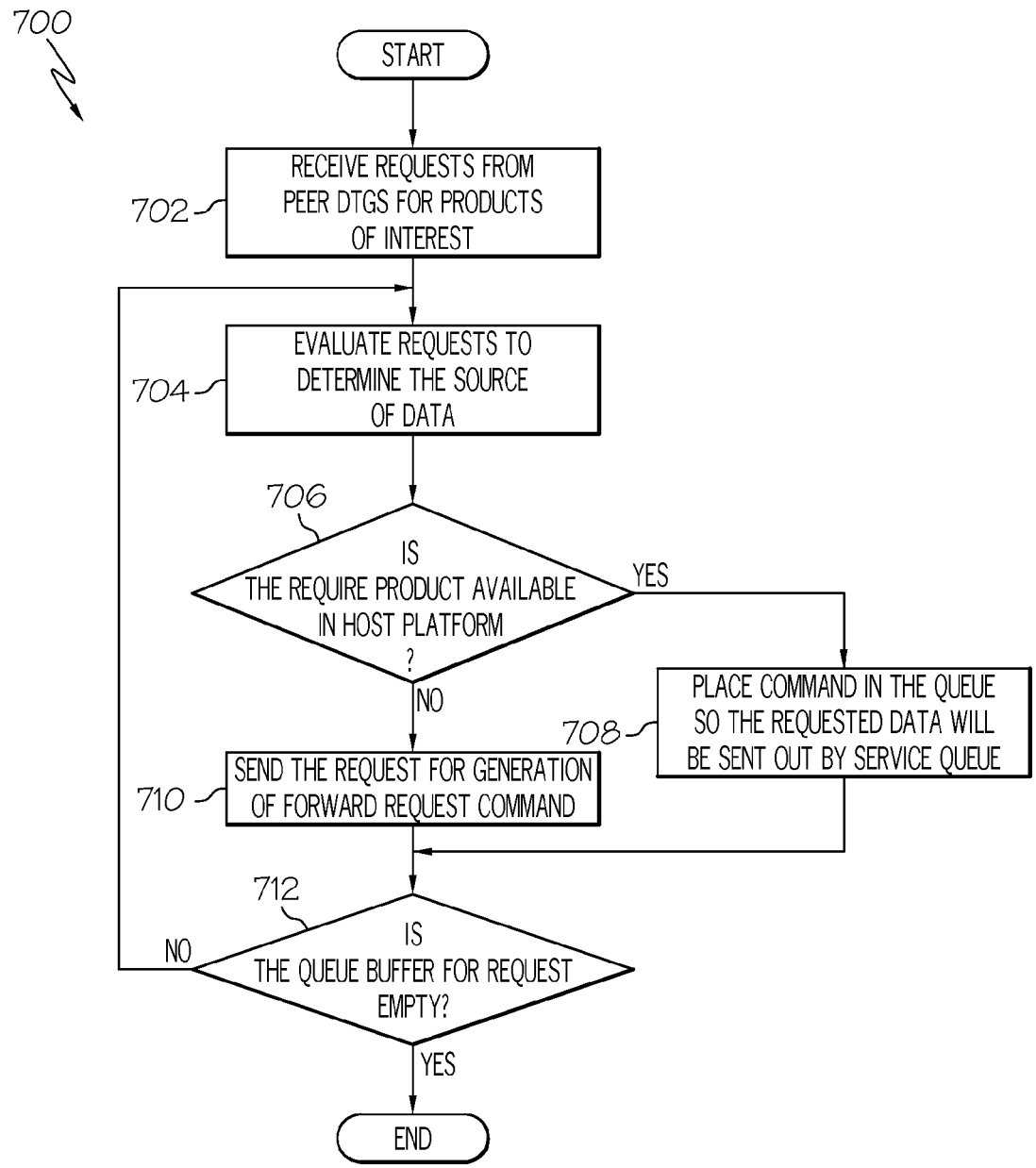
FIG. 7 is a flowchart depicting a process of processing requests from products of interest from peer platforms, and that can be implemented in conjunction with the system of FIG. 1, the control system of FIG. 2, and the processes of FIGS. 3-6, in accordance with an exemplary embodiment.

FIG. 7 is a flowchart depicting a process 700 of processing requests from products of interest from peer platforms, in accordance with an exemplary embodiment. The process 700 can be implemented in conjunction with the system 100 of FIG. 1, the control system 200 of FIG. 2, the processes 300, 400, 500, and 600 of FIGS. 3-6, and the various other processes and implementations described throughout this application, in accordance with an exemplary embodiment. The various steps of the process 700 of FIG. 7 are preferably performed separately for each host platform 102 by the DGT 104 of the respective host platform 102 via a processor, such as the processor depicted in FIG. 2.

During the process 700, requests for products of interest are received from remote, or peer, platforms 102 (step 702). Specifically, the requests for products of interest are received by the DTG 104 of each respective host platform 102 from services 107 and 108, and systems 109 of platforms 102 other than the host platform 102. The requests for products of interest pertain to information required by the services 107 and 108, and systems 109 to perform their functions for the peer platform 102, preferably in connection with the operation of the EHMS 106 of the peer platform 102. The requests for products of interest are preferably obtained by the DTG 104 from the services 107 and 108, and systems 109 of the remote platforms 102 using transceivers (such as the transceiver 204 of FIG. 2) via the communication data link 110 of FIG. 1.

The requests received in step 702 are evaluated to identify whether the products requested are produced locally on the host platform 102 (i.e., the platform on which the requests originated) or on remote, peer platforms 102 (step 704). This determination is preferably made by a processor of the DTG 104 of the host platform 102, such as the processor 208 of FIG. 2, using the catalogs and configurable databases described above in connection with the process 500 of FIG. 5.

A determination is then made as to whether the requested products of interest are available in the host platform (step 706). This determination is preferably made by a processor of the DTG 104 of the host platform 102, such as the processor 208 of FIG. 2.

If it is determined in step 706 that the requested products of interest are available on the host platform, then a command is placed in a queue for the requested products of interest, so that the requested data will be transmitted once it is obtained via the service queue (step 708). This step is preferably performed by a processor of the DTG 104 of the host platform 102, such as the processor 208 of FIG. 2.

Conversely, if it is determined in step 708 that the requested products of interest are not available on the host platform, then a forward request command is generated for the request (step 710). The forward request command is sent to an appropriate peer platform 102 so as to obtain the requested products of interest from such peer platform 102. This step is preferably performed by a processor of the DTG 104 of the host platform 102, such as the processor 208 of FIG. 2, which preferably sends the forward request command to a peer platform 102 via a transceiver, such as the transceiver 204 of FIG. 2, for execution by a DTG 104 of the peer platform 102.

A determination is then made as to whether a queue buffer for requests empty (step 712). Preferably, the queue buffer comprises a queue of requests to be examined. The queue buffer is considered to be empty when all of the existing or current requests for products of interest have been processed in steps 704-710. This determination is preferably performed by a processor of the DTG 104 of the host platform 102, such as the processor 208 of FIG. 2.

If it is determined in step 712 that the queue buffer for requests is empty, then the process terminates. Conversely, if it is determined in step 712 that the queue buffer for requests is not empty, then the process returns to step 704, and steps 704 repeat in new iterations until a determination is made in a subsequent iteration of step 712 that the queue buffer for requests is empty (at which point the process 700 terminates).

Figure 8:
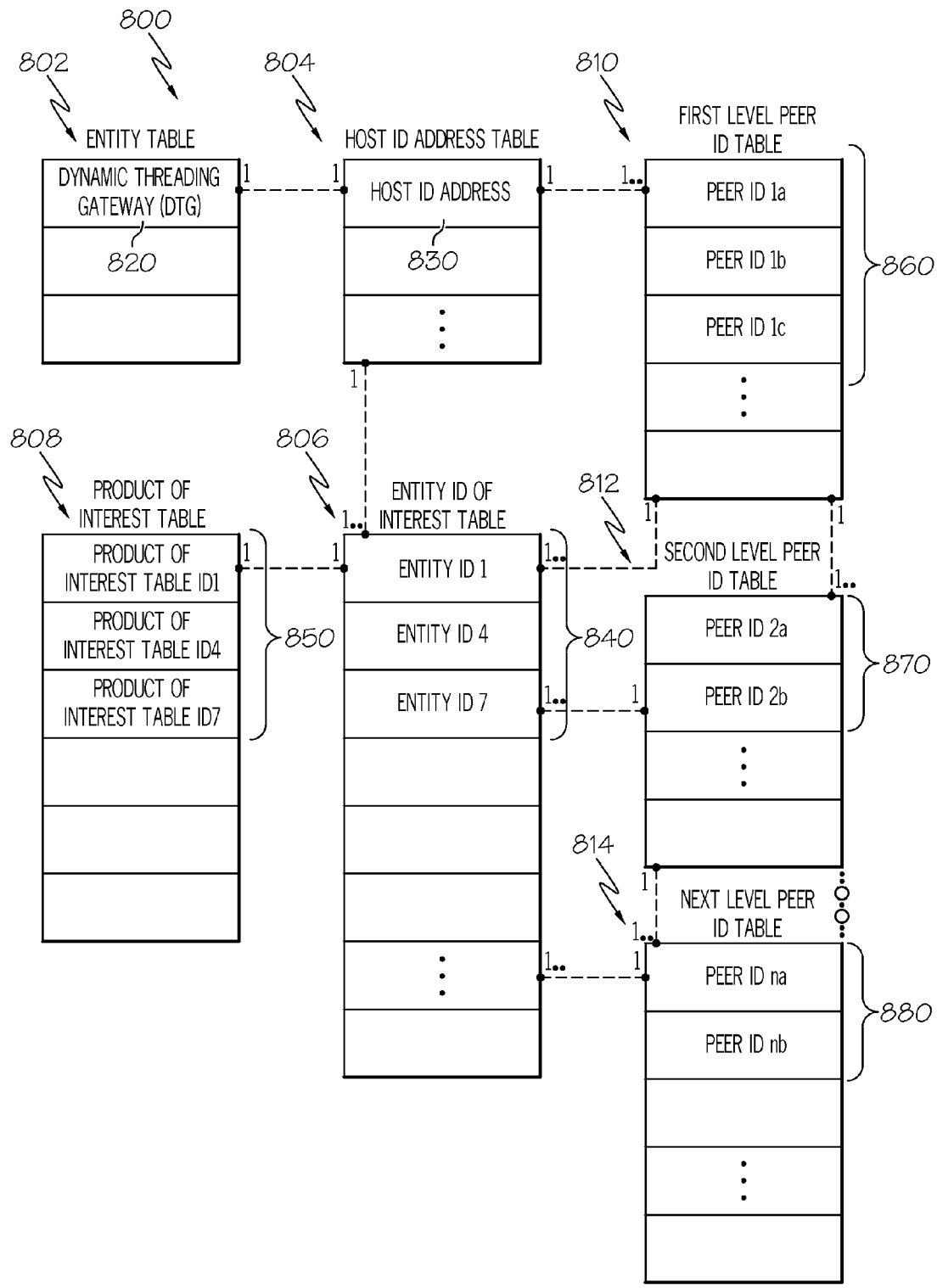
FIG. 8 is a functional diagram of a configuration of the construction of a dynamically configurable network connection and product of interest structure, and that can be implemented in conjunction with the system of FIG. 1, the control system of FIG. 2, and the processes of FIGS. 3-7, and the in accordance with an exemplary embodiment.

FIG. 8 is a functional diagram of a configuration 800 of the construction of a dynamically configurable network connection and product of interest structure, in accordance with an exemplary embodiment. The configuration 800 of FIG. 8 can be implemented in conjunction with the system 100 of FIG. 1, the control system 200 of FIG. 2, the processes 300, 400, 500, 600, and 700 of FIGS. 3-7, and the various other processes and implementations described throughout this application, in accordance with an exemplary embodiment.

As depicted in FIG. 8, the configuration 800 includes an entity table 802, a host identification address table 804, an entity identification of interest table 806, a product of interest table 808, a first level peer identification table 810, a second level peer identification table 812, and next level peer identification tables 814. Each of the host identification address table 804, the entity identification of interest table 806, the product of interest table 808, the first level peer identification table 810, the second level peer identification table 812, and the next level peer identification tables 814 are preferably stored in memory, such as the memory 210 of FIG. 2, of each of the DTGs 104 of each of the platforms 102 of FIG. 1.

The entity table 802 includes a DTG listing 820 of each dynamically threaded gateway (DTG) 104 of each of the platforms 102 of FIG. 1. Each of the DTG listings 820 has a corresponding host identification address 830 in the host identification table 804. There is a one to one correspondence between the DTG listings 820 and the corresponding host identification addresses 830, as reflected in FIG. 8.

The entity identification of interest table 806 includes a listing of entity of interest identifications 840 of each entity that provides products of interest that may be requested by services 107 and 108, and systems 109 of the platforms 102 of FIG. 1. By way of example, the entities of interest identified in the identification of interest table 806 may include other platform identifications that have been assigned to the host platform for surrogating. As reflected in FIG. 8, there need not be a one to one correspondence between the host identification addresses 830 of the host identification table 804 and the entity of interest identifications 840 of the entity identification of interest table 806. For example, a particular host identification address 830 may be associated with multiple entities of interest identifications 840. Similarly, a particular entity of interest identification 840 may be associated with multiple host identification addresses 830.

The product of interest table 808 includes a listing of product of interest identifications 850 for products of interest that may be requested by services 107 and 108, and systems 109 of the platforms 102 of FIG. 1. The products of interest each represent data and/or other information associated with the entities of interest identified in the entity identification of interest table 806. By way of example, the products of interest may include data provided by condition-based maintenance sensors (such as oil pressure, oil temperature, oil level, vibration frequency), the EHMS 106 of FIG. 1 (such as failure conditions, maintenance status, equipment and functional readiness, configuration management), a vehicle navigation system (such as a geographic position and direction of travel of a vehicle), data provided by an engine control system (for example, pertaining to engine speed, engine pressure, and various other operating conditions of the engine), data provided by an environmental control system (such as environmental temperature and pressure), and the like. As reflected in FIG. 8, there is a one to one correspondence between the entity of interest identifications 840 of the entity identification of interest table 806 and the product of interest identifications 850 of the product of interest table 808 (so that each entity of interest identification 840 is associated with a single list of product of interest identification 850, and vice versa).

The first level peer identification table 810 comprises a listing of first level peer identifications 860 for each platform 102. Specifically, for each host platform 102 of FIG. 1 (represented by a particular host identification address 830 of the host identification address table 804), the first level peer identifications 860 represent identifications of each of the peer platforms 102 that are first level peers of the host platform 102 (that is, that can communicate directly with the host platform 102 via the communication data link 110, without requiring any intermediate platforms 102). As reflected in FIG. 8, there need not be a one to one correspondence between the host identification addresses 830 of the host identification address table 804 and the first level peer identifications 860 of the first level peer identification table 810. There can be multiple first level peer identification addresses 860 for a particular host identification address 830 (namely, because there can be multiple first level peer platforms 102 for a particular host platform 102). Similarly, there can be multiple host identification addresses 830 for a particular first level peer identification address 860 (namely, because a particular platform 102 can serve as a first level peer platform 102 for multiple host platforms 102).

The second level peer identification table 812 comprises a listing of second level peer identifications 870 for each platform 102. Specifically, for each host platform 102 of FIG. 1 (represented by a particular host identification address 830 of the host identification address table 804), the first level peer identifications 860 represent identifications of each of the peer platforms 102 that are second level peers of the host platform 102 (that is, that can communicate directly with the host platform 102 via the communication data link 110, by requiring a single intermediate platform 102). As reflected in FIG. 8, there need not be a one to one correspondence between the second level peer identifications 870 and the host identification addresses 830 and/or first level peer identifications 860. For example, there can be multiple second level peer identification addresses 870 for a particular host identification address 830 (namely, because there can be multiple second level peer platforms 102 for a particular host platform 102).

The next level peer identification table 814 comprises a listing of higher level peer identifications 880 for each platform 102. Specifically, for each host platform 102 of FIG. 1 (represented by a particular host identification address 830 of the host identification address table 804), the higher level peer identifications 880 represent identifications of each of the peer platforms 102 that are higher level peers (that is, third level peer or higher) of the host platform 102 (that is, that can communicate with the host platform 102 via the communication data link 110, by requiring two or more intermediate platforms 102). As reflected in FIG. 8, there need not be a one to one correspondence between the higher level peer identifications 880 and the host identification addresses 830 and/or first level peer identifications 860 and/or second level peer identifications 870. For example, there can be multiple higher level peer identification addresses 880 for a particular host identification address 830 (namely, because there can be multiple higher level peer platforms 102 for a particular host platform 102). Similarly, there can be multiple host identification addresses 830 for a particular higher level peer identification address 880 (namely, because a particular platform 102 can serve as a higher level peer platform 102 for multiple host platforms 102). For similar reasons, there need not be a one to one relationship between the entity of interest identifications 840 of the entity ID of interest table 806 to any of the first level peer identifications 860 of the first level peer identification table 810, the second level peer identifications 870 of the second level peer identification table 812, or the higher level peer identifications 880 of the next level peer identification tables 814.

Figure 9:
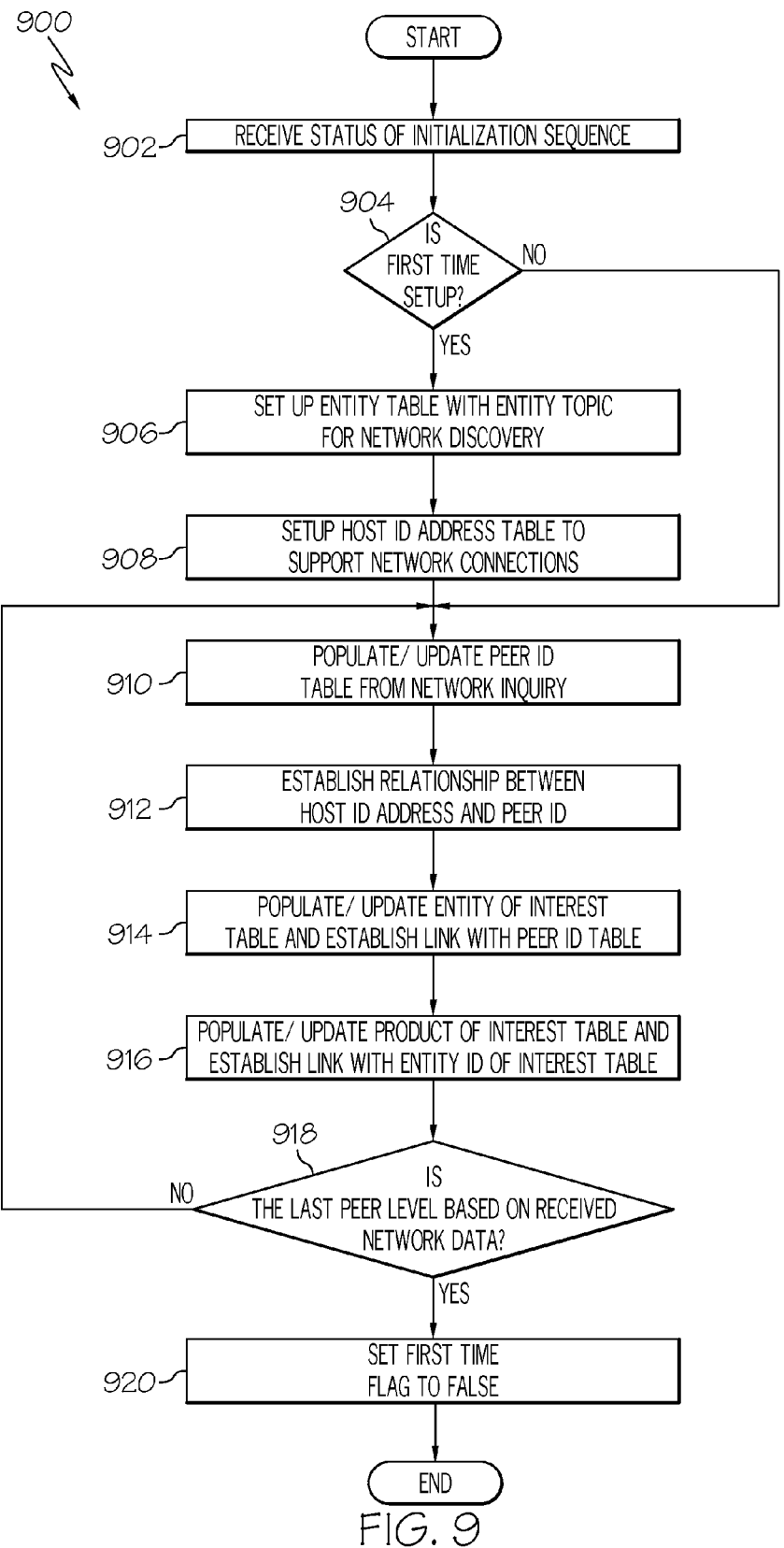
FIG. 9 is a flowchart depicting a process of constructing a dynamically configurable network connection and product of interest structure, and that can be implemented in conjunction with the system of FIG. 1, the control system of FIG. 2, the processes of FIGS. 3-7, and the configuration of FIG. 8, in accordance with an exemplary embodiment.

FIG. 9 is a flowchart depicting a process 900 of constructing a dynamically configurable network connection and product of interest structure, in accordance with an exemplary embodiment. The process 900 can be implemented in conjunction with the system 100 of FIG. 1, the control system 200 of FIG. 2, the processes 300, 400, 500, 600, and 700 of FIGS. 3-7, the configuration 800 of FIG. 8, and the various other processes and implementations described throughout this application, in accordance with an exemplary embodiment. The various steps of the process 900 of FIG. 9 are preferably performed separately for each host platform 102 by the DGT 104 of the respective host platform 102 via a processor, such as the processor 208 depicted in FIG. 2.

During the process 900 of FIG. 9, a status of an initialization sequence for the system startup is received (step 902). The status of the initialization sequence is preferably received by the DTG 104 of the host platform 102 of FIG. 1 via a data bus, such as the data bus 216 of FIG. 2.

A determination is made as to whether the initialization sequence refers to a first time set-up for the system (step 904). This determination is preferably made by a processor of the DTG 104 of the host platform 102, such as the processor 208 of FIG. 2. If it is determined in step 904 that the initialization sequence does not refer to a first time set-up for the system, then the process proceeds directly to step 910, described further below.

Conversely, if it is determined in step 904 that the initialization sequence does refer to a first time set-up for the system, then an entity table is set up (step 906). The entity table preferably corresponds to the entity table 802 of FIG. 8, and includes entity topics of interest for network discovery. The entity table is preferably established by a processor of the DTG 104 of the host platform 102, such as the processor 208 of FIG. 2, and the entity table is preferably stored in a memory of the DTG 104 of the host platform 102, such as the memory 210 of FIG. 2.

A host identification address table is also set up (step 908). The host identification address table preferably corresponds to the host identification address table 804 of FIG. 8, and includes information pertaining to the entity identifications of interest to support network connections. The host identification address table is preferably established by a processor of the DTG 104 of the host platform 102, such as the processor 208 of FIG. 2, and is preferably stored in a memory of the DTG 104 of the host platform 102, such as the memory 210 of FIG. 2.

In addition, peer identification tables are populated and updated (step 910). The peer identification tables preferably corresponds to the first level peer identification table 810, the second level peer identification table 812, and the next level identification table(s) 814 of FIG. 8. The peer identification tables are preferably populated during a first iteration of step 910, and are preferably updated during subsequent iterations of step 910. The peer identification tables are preferably established by a processor of the DTG 104 of the host platform 102, such as the processor 208 of FIG. 2, via a network inquiry, and are preferably stored in a memory of the DTG 104 of the host platform 102, such as the memory 210 of FIG. 2.

Relationships are established between the host identification address table of step 908 and the peer identification tables of step 910 and step 912. Specifically, during step 912, the relationships of FIG. 800 are established between the first level peer identifications 860, the second level peer identifications 870, and the higher level peer identifications 880 and the host identification addresses 830 of FIG. 8. The relationships are preferably established by a processor of the DTG 104 of the host platform 102, such as the processor 208 of FIG. 2, via a network inquiry, and are preferably stored in a memory of the DTG 104 of the host platform 102, such as the memory 210 of FIG. 2.

In addition, an entity of interest table is populated and updated (step 914). The entity of interest table preferably corresponds to the entity identification of interest table 806 of FIG. 8. The entity of interest table is preferably populated during a first iteration of step 914, and is preferably updated during subsequent iterations of step 914. The entity of interest table is preferably established by a processor of the DTG 104 of the host platform 102, such as the processor 208 of FIG. 2, and is preferably stored in a memory of the DTG 104 of the host platform 102, such as the memory 210 of FIG. 2. Also as part of step 914, a link is preferably established between the entity of interest table of step 914 and the peer identification tables of step 910 via the processor.

A product of interest table is also populated and updated (step 916). The product of interest table preferably corresponds to the product of interest table 808 of FIG. 8. The product of interest table is preferably populated during a first iteration of step 914, and is preferably updated during subsequent iterations of step 916. The product of interest table is preferably established by a processor of the DTG 104 of the host platform 102, such as the processor 208 of FIG. 2, and is preferably stored in a memory of the DTG 104 of the host platform 102, such as the memory 210 of FIG. 2. Also as part of step 916, a link is preferably established between the product of interest table of step 916 and the entity of interest table of step 906 via the processor.

A determination is made as to whether the last peer level has been analyzed (step 918). Specifically, during step 918, a determination is preferably made as to whether steps 910-918 have been performed with respect to each of the peer platforms of the host platform (such as all first level peers, second level peers, and higher level peers). If it is determined in step 918 that one or more peer levels have not yet been analyzed, then the process returns to step 910, and steps 910-918 repeat until there is a determination in a subsequent iteration of step 918 that all peer levels have been analyzed.

Once it is determined that all of the peer levels have been analyzed, a "first time flag" is set to false (step 920). The setting of the first time flag to false indicates that the initial set-up of the network has occurred. The first time flag is preferably set by a processor of the DTG 104 of the host platform 102 (such as the processor 208 of FIG. 2) and is preferably stored in memory of the DTG 104 of the host platform 102 (such as the memory 210 of FIG. 2). The process 900 then terminates.

Figure 10:
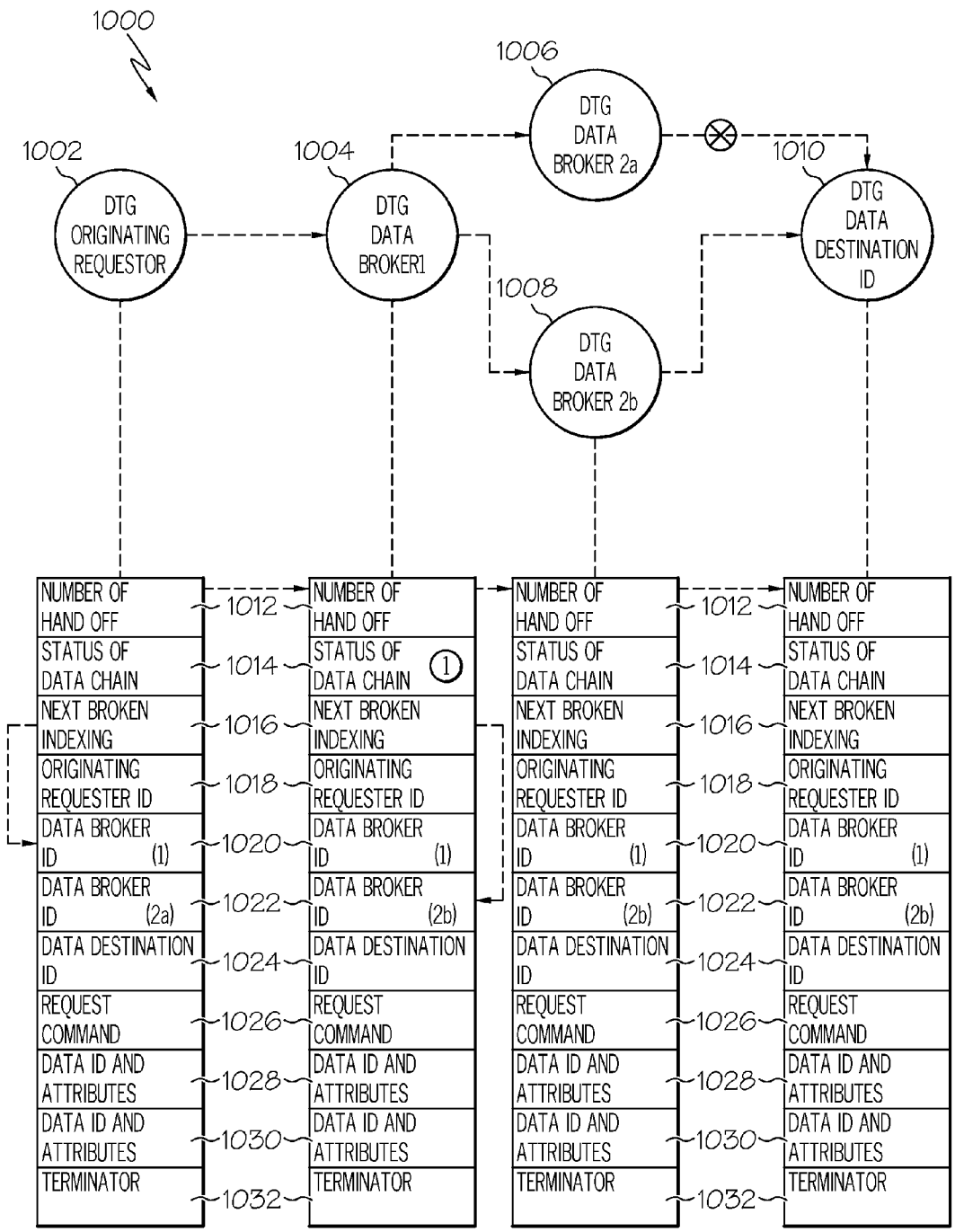
FIG. 10 is a functional diagram of a dynamic structure of a forwarding request from a service of a platform, and that can be implemented in conjunction with the system of FIG. 1, the control system of FIG. 2, the processes of FIGS. 3-7 and 9, and the configuration of FIG. 8, in accordance with an exemplary embodiment.

FIG. 10 is a functional diagram of a dynamic structure 1000 of a forwarding request from a DGT 104 of a platform on the forward path, in accordance with an exemplary embodiment. The dynamic structure 1000 can be implemented in conjunction with the system 100 of FIG. 1, the control system 200 of FIG. 2, the processes 300, 400, 500, 600, 700, and 900 of FIGS. 3-7 and 9, the configuration 800 of FIG. 8, and the various other processes and implementations described throughout this application, in accordance with an exemplary embodiment.

As depicted in FIG. 10, the dynamic structure 1000 includes a host dynamically threaded gateway (DTG) 1002, first data broker DTGs 1004, second level data broker DTGs 1006, 1008, and a data destination DTG 1010. The host DTG 1002 refers to the DTG 104 of one of the host platform 102 from which the request originated (specifically, from a service 107 and/or service 108 and/or system 109 of such host platform 102 from FIG. 1). The first data broker DTG 1004 represents a DTG 104 of a platform 102 that is a first level peer of the host platform 102 (that is, that communicates directly with the host platform 102 via the communication data link 110 of FIG. 1 without requiring any intermediate platforms 102). The second data broker DTGs 1006, 1008 represent DTGs 104 of platforms 102 that are second level peer of the host platform 102 (that is, that communicate with the host platform 102 via the communication data link 110 of FIG. 1 using the first data broker 1004 as an intermediate platform 102).

The data destination DTG 1010 has the products of interest (e.g., data) requested by the host DTG 1002. As illustrated in FIG. 10, the host DTG 1002 generates the request for the product of interest, and sends the request to the first data broker DTG 1004. The first data broker DTG 1004 determines the continuity in the forward path to the destination. If there is a discontinuity in the forward path, the data broker computes for an alternative path and modifies the structure of the request before forwarding the request to the next data broker in the chain. As illustrated, the first data broker DTG 1004 determines that the second data broker DGT 1006 no longer has the network connection with the data destination DGT 1010 based on its dynamically configurable network and product data. The first data broker DGT 1004 modifies the request and sends it to the second data broker DGT 1008 instead of DGT 1006. The second data broker 1008, in turn, forwards the request to the data destination DTG 1010.

In the depicted embodiment, the data destination DTG 1010 is depicted as a third level peer of the host DTG 1002. However, this may vary, depending upon the embodiment, the type of information requested, and the like. In certain instances, the requested product of interest may be available on the host platform 102, so that the data destination DTG 1010 is the same as the host DTG 1002. The requested products of interest may be available on a first level peer platform, so that the data destination DTG 1010 is the same as the first data broker DGT 1004. The requested products of interest may be available on a second level peer platform, so that the data destination DTG 1010 is the same as one of the second data brokers 1006, 1008. The requests are preferably generated by a processor of the respective DTGs (such as the processor 208 of FIG. 2) and are preferably transmitted among the DTGs by transceivers (such as the transceiver 204 of FIG. 2).

Also as illustrated in FIG. 10, each of the host DTG 1002, first data broker DTG 1004, second data broker DTGs 1006, 1008, and data destination DTG 1010 includes request information stored in memory (such as the memory 210 of FIG. 2) that includes a first entry 1012 representing a number of handoffs (preferably, a number of levels between peer platforms required for the communications); a second entry 1014 as to a status of the data chain that can be updated by any data broker on the forward path (for example, pertaining to refreshing events that may impact the communications between the DTGs); a third entry 1016 as to a next broker indexing (preferably, pointing to the identities of the next DTG in the sequence); a fourth entry 1018 as to the identity of the originating DTG 1000; fifth and sixth entries 1020, 1022 as to the identities of the first and second data broker DTGs 1004, 1006; a seventh entry as to the identity of the data destination DTG 1010; an eighth entry 1026 as to the request command for the requested products of interest; a ninth entry 1028 as to data identification and attributes pertaining to the requested product of interest (for example, as to which particular entity of interest and in association with the requested products of interest); a tenth entry 1030 as to additional entity of interest and its related products of interest, and an eleventh entry 1032 that includes a terminator that terminates the request to facilitate the data broker DGTs 1004, 1008, and data destination DTG 1010 in processing and re-constructing a forwarding data request. In certain embodiments, one or more additional entries may also be inserted to the request if additional entities of interest and/or their related products of interest are needed.

Figure 11:
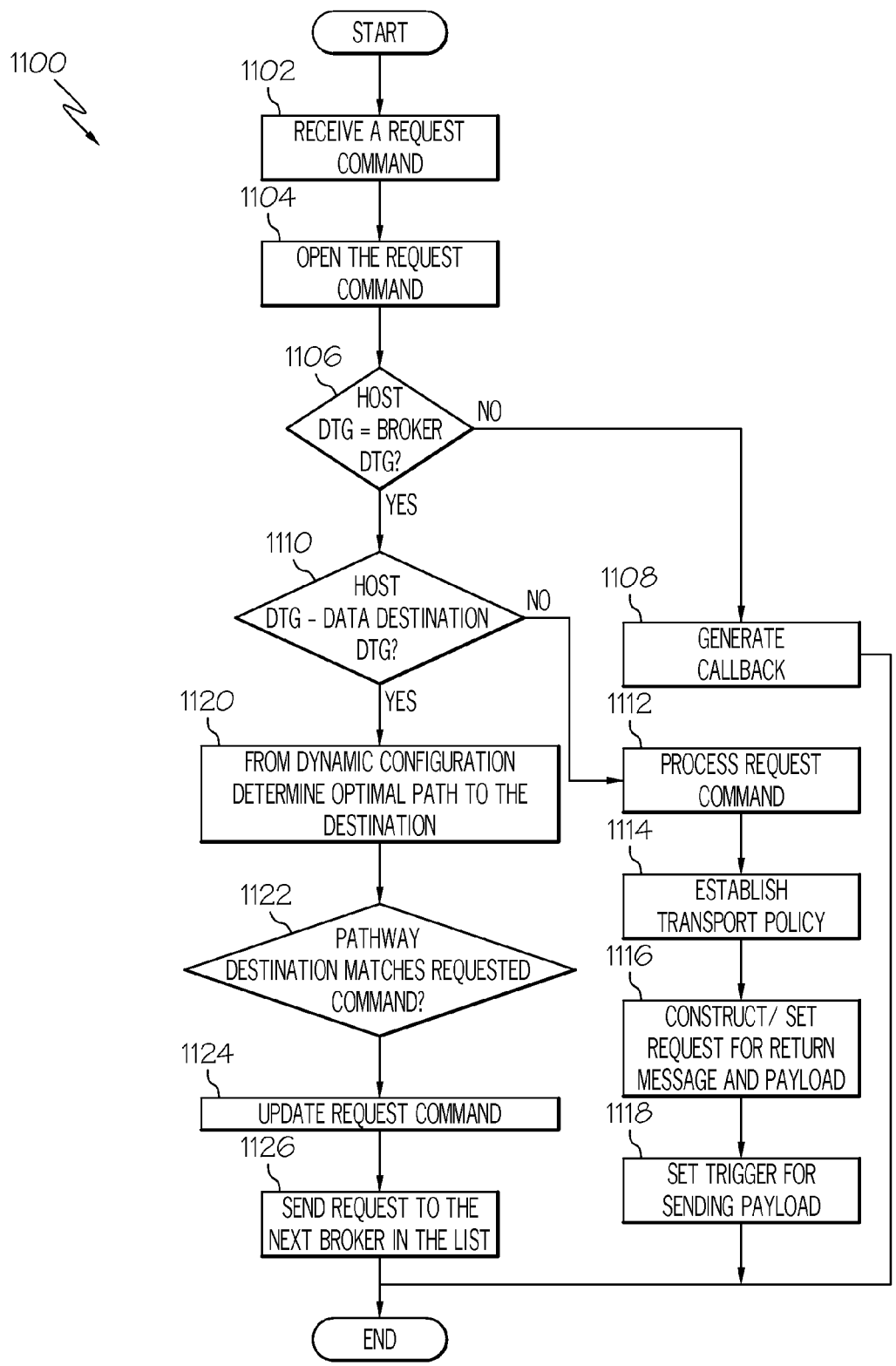
FIG. 11 is a flowchart depicting a process for facilitating data flow for processing forward request commands pertaining to a request from a service of a platform, and that can be implemented in conjunction with the system of FIG. 1, the control system of FIG. 2, the processes of FIGS. 3-7 and 9, the configuration of FIG. 8, and the dynamic structure of FIG. 10, in accordance with an exemplary embodiment.

FIG. 11 is a flowchart depicting a process 1100 for facilitating data flow for processing forward request commands pertaining to a request from a DGT 104 in FIG. 1 of a platform, in accordance with an exemplary embodiment. The process 1100 can be implemented in conjunction with the system 100 of FIG. 1, the control system 200 of FIG. 2, the processes 300, 400, 500, 600, and 700 of FIGS. 3-7 and 9, the configuration 800 of FIG. 8, the dynamic structure of FIG. 10, and the various other processes and implementations described throughout this application, in accordance with an exemplary embodiment. The various steps of the process 1000 of FIG. 10 are preferably performed separately for each host platform 102 by the DGT 104 of the respective host platform 102 via a processor, such as the processor depicted in FIG. 2.

As shown in FIG. 11, a request command is received (step 1102). The request command is preferably generated by the DTG 104 of the host platform, which preferably corresponds to the host DTG 1002 of FIG. 10. The request command is then opened and analyzed (step 1104), preferably by the host DTG 1002, identified data broker DTGs 1004, 108 and data destination DGT 1010 as illustrated in FIG. 10. These steps are preferably performed by a processor of the host DTG 1002, such as the processor 208 of FIG. 2.

A determination is made as to whether the host DTG 1002 is also one of the broker DTGs 1004, 1006, and/or 1008 of FIG. 10 (step 1106). This determination is preferably made by a processor of the host DTG 1002, such as the processor 208 of FIG. 2, by comparing the identifications being pointed by next broker indexing 1016 in FIG. 10 with the host identification 830 in FIG. 8. If it is determined that the host DTG 1002 is also one of the broker DTGS 1004, 1006, and/or 10008, then a callback is generated (step 1108) so that the products of interest are distributed (preferably by a processor of the host DTG 1002), and the process terminates.

Conversely, if it is determined that the host DTG 1002 is not one of the broker DTGS 1004, 1006, and/or 10008, then a determination is made as to whether the host DTG 1002 is also the data destination DTG 1010 (step 1110). This determination is preferably made by a processor of the host DTG 1002, such as the processor 208 of FIG. 2, by comparing the identifications from the various DTGs.

If it is determined that the host DTG 1002 is also the data destination DTG 1010, then the request command is processed by the DTG 1010 in FIG. 10 (step 1112). In addition, a transport policy is established for transporting the requested products of interest to the requesting DGT 1008 in FIG. 10 via the connection 111 of FIG. 1 (step 1114) as illustrated, a return message and payload (that includes the requested products of interest) are constructed (step 1116), and a flag is set to trigger the sending of the return message and payload to the requesting DTG 1008 (step 1118). Each of steps 1112, 1114, 1116, and 1118 are preferably performed by a processor of the host DTG 1002 (such as the processor 208 of FIG. 2) using a communication link for transport of the requested information/payload within the host platform 102 (such as via the connection 111 of FIG. 1). The process 1118 then terminates for this request.

Conversely, if it is determined that the host DTG 1002 is not the data destination DTG 1010, then a determination is made as to an optimal path between the data broker DTGs 1004 and 1008 and the data destination DTG 1010 of FIG. 10 (step 1120). The determination of step 1120 is preferably performed by a processor of the host DTG 1002, such as the processor 208 of FIG. 2.

The determination of step 1120 comprises a continuation of determination as to the "lowest cost path" between the host DTG 1002 (that is making the request for the product of interest) and the data destination DTG 1010 (that has the requested product of interest) for each request handoff by the data broker DTGs 1004 and 1008 in FIG. 10. The lowest cost path comprises the path between the respective platforms 102 of the host and destination DTGs 1002, 1010 by dynamically adjusting by data brokers along the forward path that minimizes the number of intermediate platforms 102 used for communicating between the host and destination DTGs 1002, 1010.

For example, if the requested product of interest is available on the host platform 102, then the host DTG 1002 would be the same as the data destination DTG 1010. By way of further example, if the requested product of interest is not available on the host platform 102 but is available on a first level peer platform 102 to the host platform 102 (namely, a platform 102 that can communicate with the host platform 102 without any intermediate platforms 112), then the DTG of the first level peer platform 102 comprises the data destination DTG 1010, as this represents the lowest cost path. By way of additional example, if the requested product of interest is not available on the host platform 102 or any first level peers but is available on a second level peer platform 102 to the host platform 102 (namely, a platform 102 that can communicate with the host platform 102 using only single intermediate platform 112), then the DTG of the second level peer platform 102 comprises the data destination DTG 1010, as this represents the lowest cost path. Similarly, if the requested product of interest is not available on the host platform 102 or any first or second level peers but is available on a third level peer platform 102 to the host platform 102 (namely, a platform 102 that can communicate with the host platform 102 using only two intermediate platforms 112), then the DTG of the third level peer platform 102 comprises the data destination DTG 1010, as this represents the lowest cost path, and so on.

A determination is then made as to whether the pathway destination of step 1120 matches with the requested command of step 1102 (step 1122). This determination is preferably performed by a processor of the host DTG 1002, such as the processor 208 of FIG. 2. Preferably, this determination comprises a determination as to whether the requested command already includes an identification of the pathway destination of step 1120. This determination is preferably performed by a processor of the host DTG 1002, such as the processor 208 of FIG. 2.

If it is determined in step 1122 that the pathway destination matches the requested command, the process skips to step 1126, described further below. Conversely, if it is determined in step 1122 that the pathway destination does not match the requested command, then the request command is updated to include the identification of the pathway destination of step 1120 (step 1124). This step is preferably performed by a processor of the DTG, such as the processor 208 of FIG. 2. The process then proceeds to step 1126, described below.

During step 1126, the updated request is sent to the next broker in the list. For example, if the request command is currently at the host DTG 1002 of FIG. 10, then the request will be sent to the first data broker DTG 1004 of FIG. 10. By way of further example, if the request command is currently at the first data broker DTG 1004 of FIG. 10, then the request will be sent to the second data broker DTGs 1008 with the updated request from the original request generated by DGT 1002 of FIG. 10. Similarly, if the request command is currently at the second data broker DTG 1008, then the request will be sent to the data destination DTG 1010 of FIG. 10 (or to any other intermediate platform DTGs that may communicatively separate the DTG that is currently handling the request command from the data destination DTG 1010 that has the requested product of interest).

Figure 12:
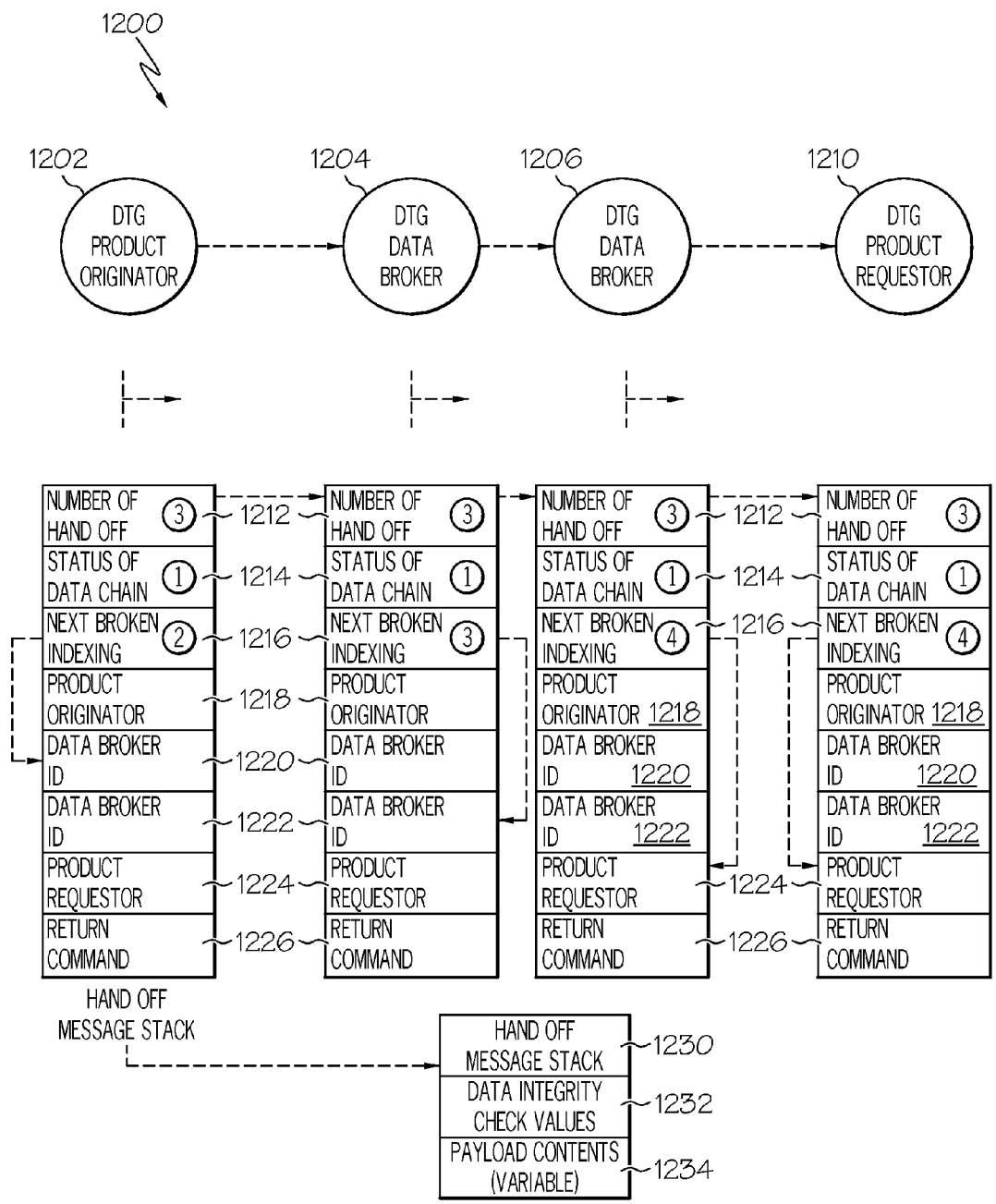
FIG. 12 is a functional diagram of a data structure for tracing returned messages with a payload pertaining to a request form a service of a platform, and that can be implemented in conjunction with the system of FIG. 1, the control system of FIG. 2, the processes of FIGS. 3-7, 9, and 11, the configuration of FIG. 8, and the dynamic structure of FIG. 10, in accordance with an exemplary embodiment.

FIG. 12 is a functional diagram of a data structure 1200 for tracing returned messages with a payload pertaining to a request originating from a product requestor DTG of a platform, in accordance with an exemplary embodiment. The data structure 1200 can be implemented in conjunction with the system 100 of FIG. 1, the control system 200 of FIG. 2, the processes 300, 400, 500, 600, 700, and 900 of FIGS. 3-7, 9, and 11, the configuration 800 of FIG. 8, the dynamic structure 1000 of FIG. 10, and the various other processes and implementations described throughout this application, in accordance with an exemplary embodiment.

As depicted in FIG. 12, the dynamic structure 1200 includes a dynamically threaded gateway (DTG) product originator 1202, DTG data brokers 1204, 1206, and a DTG product requestor 1210. The product originator 1202 provides the product of interest that has been requested by the host platform 102 services 107 and 108, and systems 109. The product originator 1202 preferably corresponds to the data destination DTG 1010 of FIG. 10. The data brokers 1204, 1206 relay messages including the product of interest (or information pertaining thereto) toward the DTG product requestor 1210. The data brokers 1204, 1206 preferably corresponds to two of the data brokers 1006-1010 of FIG. 10. The DTG product requestor 1210 preferably corresponds to the host DTG 1002 of FIG. 10.

As illustrated in FIG. 12, each of the dynamically threaded gateway (DTG) product originator 1202, DTG data brokers 1204, 1206, and DTG product requestor 1210 include information stored in memory (such as the memory 210 of FIG. 2) that includes a first entry 1212 representing a number of handoffs (preferably, a number of levels between peer platforms required for the communications); a second entry 1214 as to a status of the data chain (for example, pertaining to refreshing events that may impact the communications between the DTGs); a third entry 1216 as to a next broker indexing (preferably, including the pointer to the identities of the next DTGs in the sequence); a fourth entry 1218 as to the identity of the product originator DTG 1202; fifth and sixth entries 1220, 1222 as to the identities of the DTG data brokers 1204, 1206; and a seventh entity 1224 as to the identity of the DTG product requestor 1210. Each of the DTG data brokers 1204, 1206 and the DTG product requestor 1210 also include an eighth entry 1226 pertaining to a return command.

The DTG product originator 1202 hands off a message stack 1230 to the data broker 1204 that includes the product of interest that has been requested. In addition, the product originator DTG 1202 also provides data integrity check values 1232 (such as one or more data checksums) to the DTG data broker 1204, along with payload contents 1234 (i.e., the variable information and data) for the products of interest. The message stack 1230, the data integrity check values 1232, and the payload contents 1234 are preferably transmitted from the DTG product originator 1202 to the data broker 1204 via a transceiver, such as the transceiver 204 of FIG. 2, along the communication data link 110 of FIG. 1. The message stack 1230, the data integrity check values 1232, and the payload contents 1234 are similarly transmitted from data broker 1204 to data broker 1206, and then from data broker 1206 to product requestor DGT 1210, via a transceiver, such as the transceiver 204 of FIG. 2, along the communication data link 110 of FIG. 1.

Figure 13:
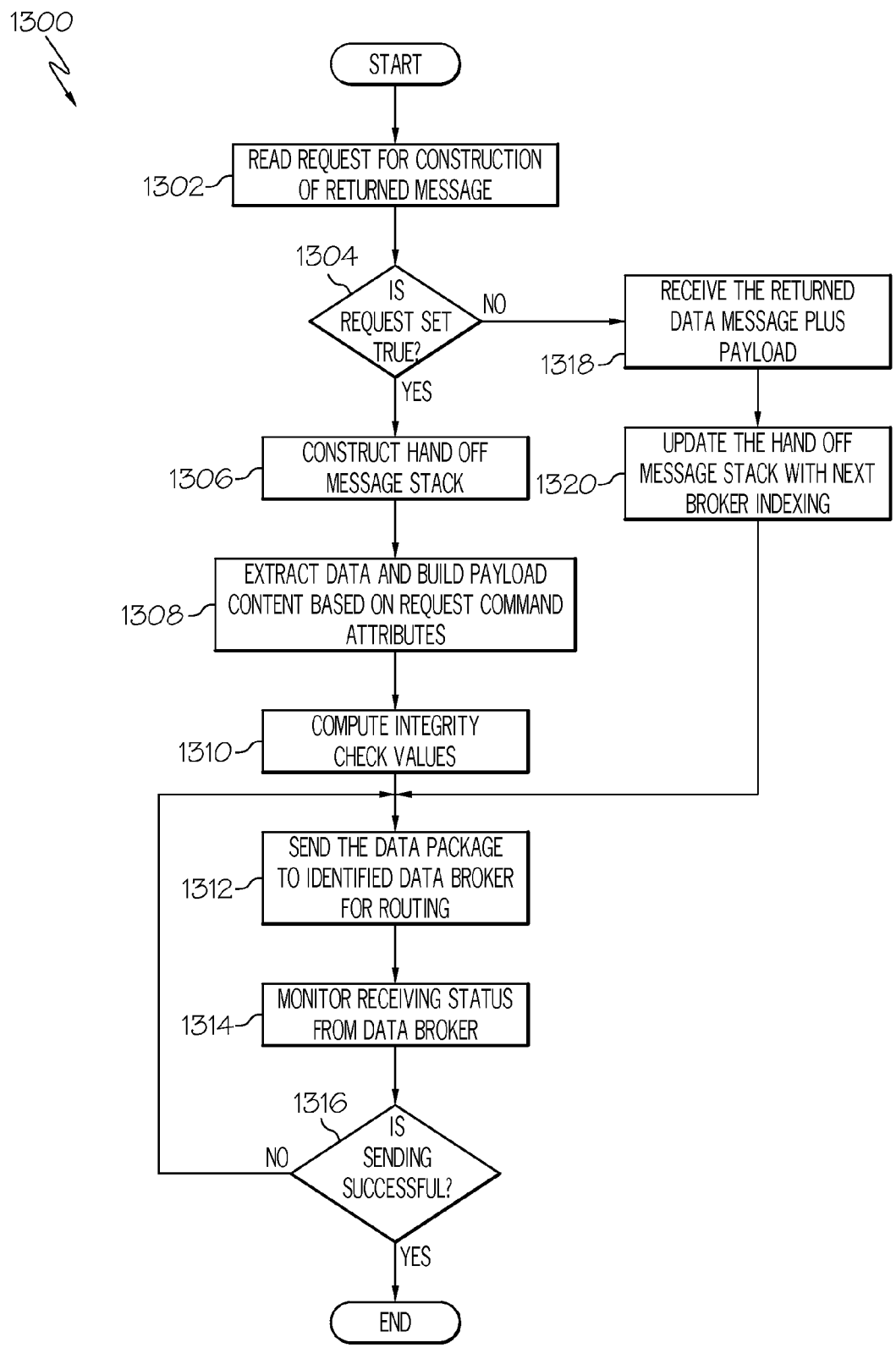
FIG. 13 is a flowchart depicting a process for constructing data returned messages pertaining to a request from a service of a platform, and that can be implemented in conjunction with the system of FIG. 1, the control system of FIG. 2, the processes of FIGS. 3-7, 9, and 11, the configuration of FIG. 8, the dynamic structure of FIG. 10, and the data structure of FIG. 12, in accordance with an exemplary embodiment.

FIG. 13 is a flowchart depicting a process 1300 for constructing data returned messages pertaining to a request from a service of a platform, in accordance with an exemplary embodiment. The process 1300 can be implemented in conjunction with the system 100 of FIG. 1, the control system 200 of FIG. 2, the processes 300, 400, 500, 600, 700, 900, and 1100 of FIGS. 3-7, 9, and 11, the configuration 800 of FIG. 8, the dynamic structure 1000 of FIG. 10, the data structure 1200 of FIG. 12, and the various other processes and implementations described throughout this application, in accordance with an exemplary embodiment. The various steps of the process 1300 of FIG. 13 are preferably performed separately for each host platform 102 by the DGT 104 of the respective host platform 102 via a processor, such as the processor depicted in FIG. 2.

As shown in FIG. 13, a request for construction of a return message (including the payload of products of interest) is received by identified data broker DTGs (step 1302). The request of step 1302 is preferably generated by the product originator DTG 1202 and passed along the data broker DTGs 1204 and 1206 on the way back to the data requestor DGT of FIG. 12. The request is preferably made by a transceiver, such as the transceiver 204 of FIG. 2.

A determination is made as to whether the request is set to true (step 1304). This determination is preferably made by a processor, such as the processor 208 of FIG. 2, as to whether the returned message with the product of interest has already been created. If it is determined that the request is set to false (i.e., that the message with the product of interest has already been created), then the process skips to step 1318, described further below.

Conversely, if it is determined that the request is set to true (i.e., that the message with the products of interest has not already been created), then the process proceeds to step 1306, described directly below. During step 1306, the handoff message stack is constructed. The handoff message stack preferably corresponds to the hand off message stack 1230 of FIG. 12, and is preferably generated by a processor of the DTG product originator 1202 of FIG. 12, such as the processor 208 of FIG. 2.

Data is extracted from the data storage of the product generator DTG 1202 of FIG. 12, and payload content is built based on request command attributes (step 1308). The payload content preferably includes the requested information pertaining to the requested products of interest, and preferably corresponds to the payload contents 1234 of FIG. 12. Step 1308 is preferably performed by a processor of the DTG product originator 1202 of FIG. 12, such as the processor 208 of FIG. 2.

The integrity check values are computed from the payload contents (step 1310). Data is extracted from the DGT data storage, and payload content is built based on request command attributes (step 1310). The integrity check values preferably correspond to the data integrity check values 1232 of FIG. 12. The integrity check values are preferably generated by a processor of the DTG product originator 1202 of FIG. 12, such as the processor 208 of FIG. 2.

The data package (including the handoff message stack, the payload contents, and the data integrity check values) are transmitted to an identified data broker for routing (step 1312). During various iterations of step 1314, the data package is preferably transmitted from (i) the product originator DTG 1202 of FIG. 12 to data broker DTG 1204 of FIG. 12; (ii) data broker DTG 1204 of FIG. 12 to data broker DTG 1206 of FIG. 12; and, ultimately, (iii) data broker DTG 1206 of FIG. 12 to product requestor DTG 1210 of FIG. 12, via transceivers (such as the transceiver 204 of FIG. 2) along the communication data link 110 of FIG. 1.

The receiving status of the message is monitored from the data broker (step 1314). Specifically, during each iteration of step 1314, the receiving status is monitored by the DTG that is set to receive the message during the particular iteration of step 1314. The receiving step is preferably monitored by a processor of the DTG, such as the processor 208 of FIG. 2.

A determination is made as to whether the sending of the message is successful (step 1316). This determination is preferably made by one of the DTG processors, such as the processor 208 of FIG. 2. If it is determined in step 1316 that the sending of the message is successful, then the process terminates. Conversely, if it is determined in step 1316 that the sending of the message is not successful, then the process returns to step 1312, and steps 1312 and 1314 repeat in various iterations until a determination is made in an iteration of step 1316 that the sending of the message is successful (as which point the process terminates).

Accordingly, improved systems and methods are provided for health monitoring for various platforms, such as vehicles. For example, the improved systems and methods allow for improved usage and interaction between dynamic threaded gateways (DTGs) of multiple platforms, such as in a fleet of vehicles.

It will be appreciated that the steps in the various processes depicted in the Figures and/or described above may vary, may be executed simultaneously, and/or may be executed in a different order than depicted in the Figures and/or described above. It will similarly be appreciated that various apparatus, devices, systems, interactions, relationships, management, and/or other features, and/or parts and/or components thereof, may vary from those depicted in the Figures and/or described above. It will also be appreciated that the methods and systems may be implemented in connection with any number of different types of land vehicles, aircraft, spacecraft, marine vehicles, other types of vehicles, computers, controllers, control centers, operators, devices, systems, modules, and/or any number of other different types of platforms.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A method for obtaining information on a system comprising a plurality of platforms coupled via a communication link, the method comprising the steps of:
   collecting products of interest from the plurality of platforms;
   identifying which of the plurality of platforms provide intermediate brokerage for the information;
   identifying a plurality of different paths for obtaining information for a source platform from a destination platform among the plurality of platforms for obtaining the information, based at least in part of the collecting of the products of interest and the identifying of which of the plurality of platforms provide intermediate brokerage for the information, wherein each of the plurality of paths includes:
      a respective forward path from the source platform to the destination; and
      a respective return path from the destination to the return platform;
   calculating a cost index separately for each of the plurality of paths, including the forward path from the source platform to the destination platform and the return path from the destination platform to the source platform, the cost index comprising an expected number of connections required for each of the plurality of paths to obtain the requested information from the destination for the source platform and to return to the source platform;
   selecting, using a processor of a dynamically threaded gateway, a selected path of the plurality of paths using the cost index, wherein the selected path is selected as the path of the plurality of paths requiring the fewest expected number of connections to obtain the requested information from the destination for the source platform and to return to the source platform, thereby minimizing the expected number of required connections;
   establishing a hand-off sequencing for the selected path using a a dynamic construct that dynamically threads the selected path from the source to the destination and returning to the source using a plurality intermediate platforms between the source and the destination, to minimize the number of required connections;
   evaluating and updating the hand-off sequence at each of the intermediate platforms of the selected in order to minimize the number of connections required for the remainder of the selected path;
   obtaining the information via the dynamically threaded hand-off sequencing for the selected path;
   determining an actual number of connections that were experienced in obtaining the information along the forward path of the selected path;
   dynamically updating the hand-off sequencing for the selected path, including the return path for the selected path, based on the actual number of connections that were experienced along the forward path, to minimize the number of required connections for the return path; and
   returning with the information from the destination to the source via the dynamically updated hand-off sequence for the return path.

2. The method of claim 1, wherein:
   each of the plurality of platforms comprises a vehicle in a formed network group; and
   the step of identifying the plurality of paths comprises identifying the plurality of paths such that a host vehicle in the group can obtain the information from another vehicle in the group along each of the plurality of paths via the communication link.

3. The method of claim 1, further comprising:
   maintaining a peer connectivity list for the plurality of platforms representing a listing of which platforms are directly communicatively linked together; and
   calculating the cost index using the peer connectivity list, wherein the step of maintaining the peer connectivity list comprises maintaining a record of which of the plurality of platforms are in line of sight and within communication range with one another, and the cost index is calculated based at least in part on which of the plurality of platforms are in line of sight with one another.

4. The method of claim 1, further comprising the step of:
   receiving a request for the information on a host platform of the plurality of platforms;
   wherein the step of identifying the plurality of paths comprises:
      identifying a plurality of destination platforms of the plurality of platforms that can provide the information; and
      identifying the plurality of paths such that each path of the plurality of paths communicatively connects the host platform with one of the plurality of destination platforms.

5. The method of claim 4, wherein:
   the host platform can communicate directly with a first subset of the plurality of platforms but not with a second subset of the plurality of platforms, such that communications between the host platform and one of the second subset requires one or more intermediate platforms; and
   the step of selecting the selected one of the plurality of paths comprises selecting the selected one of the plurality of paths by minimizing a total number of platforms required for communication between the host platform and one of the destination platforms along the path that minimizes the number of required connections.

6. The method of claim 5, further comprising the steps of:
   generating a command for obtaining the information;
   forwarding the command along each platform in the selected path from the host platform to the destination platform;
   generating a response message with the information; and
   forwarding the response message along each platform in the selected path from the destination platform to the host platform.

7. The method of claim 4, wherein:
   the selected path comprises a request path for the request of the information from the host platform to the source platform and a return path for the requested information from the source platform to the destination platform; and
   the method further comprises providing a feedback loop from the return path to provide updates for the host platform for use in updating the selected path for use in minimizing the number of connections for subsequently requested information.

8. The method of claim 4, wherein:
   the selected path comprises a request path for the request of the information from the host platform to the source platform and a return path for the requested information from the source platform to the destination platform; and
   the method further comprises continuously constructing the request path and the return path for products of interest using peer collaborative constructors for use in minimizing the number of connections for the request path and the return path.

9. The method of claim 4, further comprising:

maintaining current statuses of product availability, data brokers, and products of interest from producer sources via fusing data from direct inquiries from the host platform via the request path and via responsive data returned by the return path in response to the direct inquiries for use in minimizing the number of connections.

10. A system comprising a dynamically threaded gateway comprising:

a transceiver residing on a host platform of a plurality of platforms, the transceiver configured to communicate with other of the plurality of platforms along a communication link; and a processor residing on the host platform, the processor coupled to the transceiver and configured to:

facilitate collection of products of interest from the plurality of platforms;

identify which of the plurality of platforms provide intermediate brokerage for the information;

identify a plurality of different paths for obtaining information for a source platform from a destination platform among the plurality of platforms for obtaining requested information, based at least in part of the collecting of the products of interest and the identifying of which of the plurality of platforms provide intermediate brokerage for the information, wherein each of the plurality of paths includes:

a respective forward path from the source platform to the destination; and a respective return path from the destination to the return platform;

calculate a cost index separately for each of the plurality of paths, including the forward path from the source platform to the destination platform and the return path from the destination platform to the source platform, the cost index comprising an expected number of connections required for each of the plurality of paths to obtain the requested information from the destination for the source platform and to return to the source platform;

select a selected path of the plurality of paths using the cost index, wherein the selected path is selected as the path of the plurality of paths requiring the fewest expected number of connections to obtain the requested information from the destination for the source platform and to return to the source platform, thereby minimizing the expected number of required connections;

establish a hand-off sequencing for the selected path using a dynamic construct that dynamically threads the selected path from the source to the destination and returning to the source using a plurality intermediate platforms between the source and the destination, to minimize the number of required connections;

evaluate and update the hand-off sequence at each of the intermediate platforms of the selected in order to minimize the number of connections required for the remainder of the selected path;

obtain the information via the path via the dynamically threaded hand-off sequencing for the selected path, using the transceiver;

determine an actual number of connections that were experienced in obtaining the information along the forward path of the selected path;

dynamically update the hand-off sequencing for the selected path, including the return path for the selected path, based on the actual number of connections that were experienced along the forward path, to minimize the number of required connections for the return path; and return with the information from the destination to the source via the dynamically updated hand-off sequence for the return path.

11. The system of claim 10, wherein:

the host platform comprises a host vehicle in a formed network group of vehicles; and the processor is configured to identify the plurality of paths such that the host vehicle can obtain the requested information from another vehicle in the group along each of the plurality of paths via the communication link.

12. The system of claim 10, wherein the processor is further configured to:

maintain a peer connectivity list for the plurality of platforms representing a listing of which platforms are directly communicatively linked together; and calculate the cost index using the peer connectivity list, wherein the processor is further configured to maintain the peer connectivity list by maintaining a record of which of the plurality of platforms are in line of sight with one another, and the cost index is calculated based at least in part on which of the plurality of platforms are in line of sight with one another.

13. The system of claim 10, wherein the processor is further configured to:

receive a request for the information from within the host platform;

identify a plurality of destination platforms of the plurality of platforms that can provide the information; and identify the plurality of paths such that each path of the plurality of paths communicatively connects the host platform with one of the plurality of destination platforms.

14. The system of claim 13, wherein:

the host platform can communicate directly with a first subset of the plurality of platforms but not with a second subset of the plurality of platforms, such that communications between the host platform and one of the second subset requires one or more intermediate platforms; and the processor is configured to select the selected path of the plurality of paths by minimizing a total number of platforms required for communication between the host platform and a one of the destination platforms along the path that minimizes the number of required connections.

15. A system comprising:

a communication network;

a plurality of platforms coupled together via the communication network, each of the plurality of platforms comprising a dynamically threaded gateway comprising:

a transceiver configured to communicate with other of the plurality of platforms along a communication link; and a processor coupled to the transceiver and configured to:

identify a plurality of different paths for obtaining information for a source platform from a destination platform among the plurality of platforms for obtaining requested information, based at least in part on products of interest available from the plurality of platforms and an identification of which of the plurality of platforms provide intermediate brokerage for the information, wherein each of the plurality of paths includes:

a respective forward path from the source platform to the destination; and a respective return path from the destination to the return platform;
calculate a cost index separately for each of the plurality of paths, including the forward path from the source platform to the destination platform and the return path from the destination platform to the source platform, the cost index comprising an expected number of connections required for each of the plurality of paths to obtain the requested information from the destination for the source platform and to return to the source platform;
select a selected path of the plurality of paths using the cost index, wherein the selected path is selected as the path of the plurality of paths requiring the fewest expected number of connections to obtain the requested information from the destination for the source platform and to return to the source platform, thereby minimizing the expected number of required connections;
establish a hand-off sequencing for the selected path using a dynamic construct that dynamically threads the selected path from the source to the destination and returning to the source using a plurality intermediate platforms between the source and the destination, to minimize the number of required connections;
evaluate and update the hand-off sequence at each of the intermediate platforms of the selected in order to minimize the number of connections required for the remainder of the selected path;
obtain the information via the path via the dynamically threaded hand-off sequencing for the selected path, using the transceiver;
determine an actual number of connections that were experienced in obtaining the information along the forward path of the selected path;
dynamically update the hand-off sequencing for the selected path, including the return path for the selected path, based on the actual number of connections that were experienced along the forward path, to minimize the number of required connections for the return path; and
return with the information from the destination to the source via the dynamically updated hand-off sequence for the return path.

16. The system of claim 15, wherein the plurality of platforms comprises a fleet of vehicles.

17. The system of claim 15, wherein the processor is further configured to:
maintain a peer connectivity list for the plurality of platforms representing a listing of which platforms are directly communicatively linked together; and
calculate the cost index using the peer connectivity list, wherein the processor is further configured to maintain the peer connectivity list by maintaining a record of which of the plurality of platforms are in line of sight with one another, and the cost index is calculated based at least in part on which of the plurality of platforms are in line of sight with one another.

18. The system of claim 15, wherein the processor of a respective host platform is further configured to:
receive a request for the information from within the host platform;
identify a plurality of destination platforms of the plurality of platforms that can provide the information; and
identify the plurality of paths such that each path of the plurality of paths communicatively connects the host platform with one of the plurality of destination platforms.

19. The system of claim 18, wherein:
the host platform can communicate directly with a first subset of the plurality of platforms but not with a second subset of the plurality of platforms, such that communications between the host platform and one of the second subset requires one or more intermediate platforms; and
the processor of the host platform is configured to select the selected path of the plurality of paths by minimizing a total number of platforms required for communication between the host platform and a closest one of the destination platforms along the path.

20. The system of claim 19, wherein:
the host platform is further configured to:
generate a command for obtaining the information; and
forward the command along the selected path toward the destination platform; and
the destination platform is further configured to:
generate a response message with the information; and
forward the response message along the selected path toward the host platform.

* * * * *